United States Patent
Tsai et al.

(10) Patent No.: US 7,663,279 B2
(45) Date of Patent: Feb. 16, 2010

(54) MOTOR MODULE

(75) Inventors: Ming-Chin Tsai, Kaohsiung (TW);
Guang-Miao Huang, Kaohsiung (TW);
Chien-Chin Huang, Tainan (TW);
Liang-Yi Hsu, Makung (TW);
Mi-Ching Tsai, Tainan (TW)

(73) Assignee: Metal Industries Research & Development Centre (TW)

( * ) Notice: Subject to any disclaimer, the term of this patent is extended or adjusted under 35 U.S.C. 154(b) by 284 days.

(21) Appl. No.: 11/899,041

(22) Filed: Aug. 31, 2007

(65) Prior Publication Data

US 2008/0150402 A1    Jun. 26, 2008

(30) Foreign Application Priority Data

| Dec. 20, 2006 | (TW) | 95148054 A |
| Dec. 20, 2006 | (TW) | 95148056 A |
| Jan. 10, 2007 | (TW) | 96101000 A |
| Jan. 10, 2007 | (TW) | 96101001 A |

(51) Int. Cl.
*H02K 5/16* (2006.01)

(52) U.S. Cl. .................. 310/90; 310/67 R; 310/68 R

(58) Field of Classification Search .................. 310/71, 310/67 R, 68 R, 89–90, 254, 261, 265
See application file for complete search history.

(56) References Cited

U.S. PATENT DOCUMENTS

| 4,394,594 | A | * | 7/1983 | Schmider et al. | 310/68 R |
| 4,755,699 | A | * | 7/1988 | Schmider | 310/68 R |
| 4,800,307 | A | * | 1/1989 | Papst | 310/67 R |
| 5,355,373 | A | * | 10/1994 | Salmon et al. | 310/71 |
| 6,097,120 | A | * | 8/2000 | Horng | 310/90.5 |
| 6,097,129 | A | * | 8/2000 | Furtwangler et al. | 310/256 |
| 6,232,690 | B1 | * | 5/2001 | Schmider | 310/156.37 |
| 6,462,443 | B2 | * | 10/2002 | Horng | 310/68 B |
| 7,109,631 | B2 | * | 9/2006 | Tsai et al. | 310/268 |
| 7,221,069 | B2 | * | 5/2007 | Horng et al. | 310/67 R |
| 7,224,095 | B2 | * | 5/2007 | Chen | 310/190 |
| 7,265,464 | B2 | * | 9/2007 | Chen | 310/68 B |
| 7,541,709 | B2 | * | 6/2009 | Tsai et al. | 310/90 |

* cited by examiner

*Primary Examiner*—Thanh Lam
(74) *Attorney, Agent, or Firm*—Morris, Manning & Martin, LLP; Tim Tingkang Xia

(57) ABSTRACT

A motor module includes a bearing housing having a loading base, an electric unit, a bearing, and a magnetic rotor unit disposed on the bearing. In addition, a protruding portion is extending from the loading base, and the electric unit includes a printed circuit board (PCB) and sensing elements, wherein the PCB is utilized for disposing the loading base thereon. Moreover, signal circuits and motor windings are formed on the PCB around the loading base, the sensing elements are disposed around the motor windings, and the bearing is disposed at the protruding portion. Besides, the magnetic rotor unit is disposed on the motor windings, keeping a gap with the PCB; therefore, when electric current passes the motor windings, the magnetic rotor unit and the motor windings generate a flux linkage induction, so as to drive the magnetic rotor unit to rotate relative to the PCB.

34 Claims, 33 Drawing Sheets

MOTOR MODULE

This application claims the benefit of Taiwan Patent Application No. 095148056, filed on Dec. 20, 2006, Taiwan Patent Application No. 095148054, filed on Dec. 20, 2006, Taiwan Patent Application No. 096101001, filed on Jan. 10, 2007, and Taiwan Patent Application No. 096101000, filed on Jan. 10, 2007, which are hereby incorporated by reference for all purposes as if fully set forth herein.

BACKGROUND OF THE INVENTION

1. Field of Invention

The present invention relates to a motor module, and more particularly, to a modular and miniature assembly motor.

2. Related Art

Miniature motor modules in current practice include a motor system and a circuit board for driving. In most of the miniature motor modules, the motor system is firstly assembled; then, signal lines and power lines pre-installed inside the motor system are pulled out to connect with the circuit board, so as to drive the motor system of the miniature motor module to operate; therefore, parts to be driven can be driven by the motor system.

However, volumes of the above-mentioned miniature motor modules may not be miniaturized because their motor system is too complex. As shown in FIG. 1, it is a conventional motor system P10. The motor system P10 is induced by magnetic flux in radial directions generated by means of the stator winding P11 and the rotor magnetic P12 to rotate. And most of the stator windings P11 are produced by the way of mechanical automation; hence, how precision of the mechanical automation affects the rate of slots to be occupied by coils of the motor windings. In addition, a lot of conductive magnet plates have to be used; however, poor rotation efficiency of the motor system P10 may still occur because of effects of unsmooth operation or large cogging torque. Besides, if the rate of slots to be occupied by coils of the motor windings is too high, the thickness of the whole motor system P10 will be increased, so that the purpose of the miniaturization may not be achieved.

Therefore, the components of the above-mentioned motor system P10 would not be easily reduced, so that the difficulty for assembly is increased and the mechanical automation for assembling is also hard to be applied. Besides, there is also a problem when the motor system P10 is connected to the driving circuits of the circuit board for driving in final assembly stage; therefore, the space size of the motor becomes harder to be reduced.

From above facts, currently there exist problems that the motor system P10 of the miniature motor module and the circuit board for driving are unable to be implemented as a modular design. This will also affect assembly of the miniature motor modules. Therefore, it can be seen that the miniature motor modules is still unable to achieve simplification and compactness, and the problems are needed to be overcome.

SUMMARY OF THE INVENTION

In view of the above, one object of the present invention is to provide a motor module, which is used to overcome the assembly problems for the circuits of circuit board and the motor system.

According to one aspect of the present invention, a motor module is provided. The motor module comprises a bearing housing having a loading base and a protruding portion, an electric unit, a bearing disposed on the bearing housing, and a magnetic rotor unit stackedly disposed on the bearing. The electric unit comprises a printed circuit board (PCB) and a plurality of sensing elements, wherein the PCB is utilized for disposing the loading base thereon. In addition, by means of wirings, signal circuits and motor windings are formed on the PCB, where is around the disposed loading base, and the sensing elements are disposed around the motor windings. In addition, the magnetic rotor unit is stackedly disposed not only on the bearing but also on the motor windings, keeping a gap with the PCB; therefore, when electric current passes the motor windings, the motor windings and the magnetic rotor unit generate a flux linkage induction, so as to drive the magnetic rotor unit to rotate relative to the PCB.

For solving the above mentioned problems, another aspect of the present invention is to provide a motor module. The motor module comprises a bearing housing having a loading base and a protruding portion, an electric unit with PCB, a bearing disposed at the bearing housing, and a magnetic rotor unit stackedly disposed on the bearing. The PCB is utilized for disposing the loading base thereon. In addition, by means of wirings, signal circuits and motor windings are formed on the PCB, where is around the disposed loading base, wherein a sensorless control IC is disposed on the signal circuits. In addition, the magnetic rotor unit is stackedly disposed not only on the bearing but also on the motor windings, keeping a gap with the PCB; therefore, when electric current passes the motor windings, the motor windings and the magnetic rotor unit generate a flux linkage induction, so as to drive the magnetic rotor unit to rotate relative to the PCB.

The present invention can provide the advantages and effects as described below.

By implementation of the present invention, because a semiconductor wiring process is adopted for the wirings of the electric unit, the signal circuits and the motor windings are formed at the same time, so that the volume and the thickness in the axis direction of the wires of the whole motor windings wouldn't be increased, that is suitable for simplifying and minimizing structure of motor modules. Besides, because the signal circuits and the motor windings are integrately designed, they can be formed on the PCB at the same time; therefore, the yield rate of the wires of the motor winding can be effectively improved. Also, because it adopts a semiconductor process, it can be combined to the current circuit board manufacturing processes. Moreover, because the electric unit and the magnetic rotor unit are designed as individual modules, the components of motor can be effectively reduced, so as to improve the assembly rate of motor and achieve the purpose of reducing motor volume.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become, apparent to those skilled in the art from this detailed description.

BRIEF DESCRIPTION OF THE DRAWINGS

The present invention will become more fully understood from the detailed description given herein below for illustration only, and which thus is not limitative of the present invention, and wherein.

DETAILED DESCRIPTION OF THE INVENTION

Figure 1:
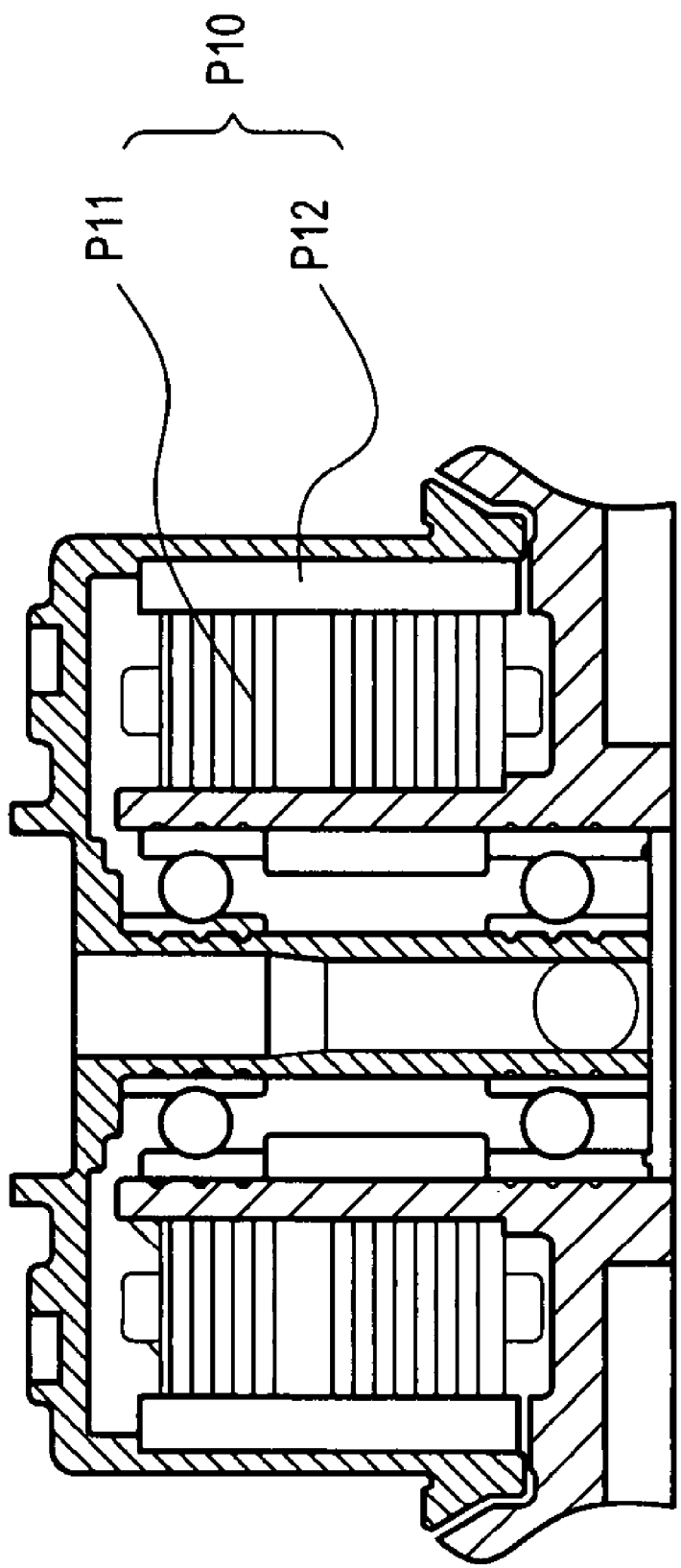
FIG. 1 is a schematic view of a conventional motor system.

The contents of the present invention are described in details through specific embodiments with reference to the figures. The reference numerals mentioned in the specification correspond to equivalent reference numerals in the figures.

Figure 2A:
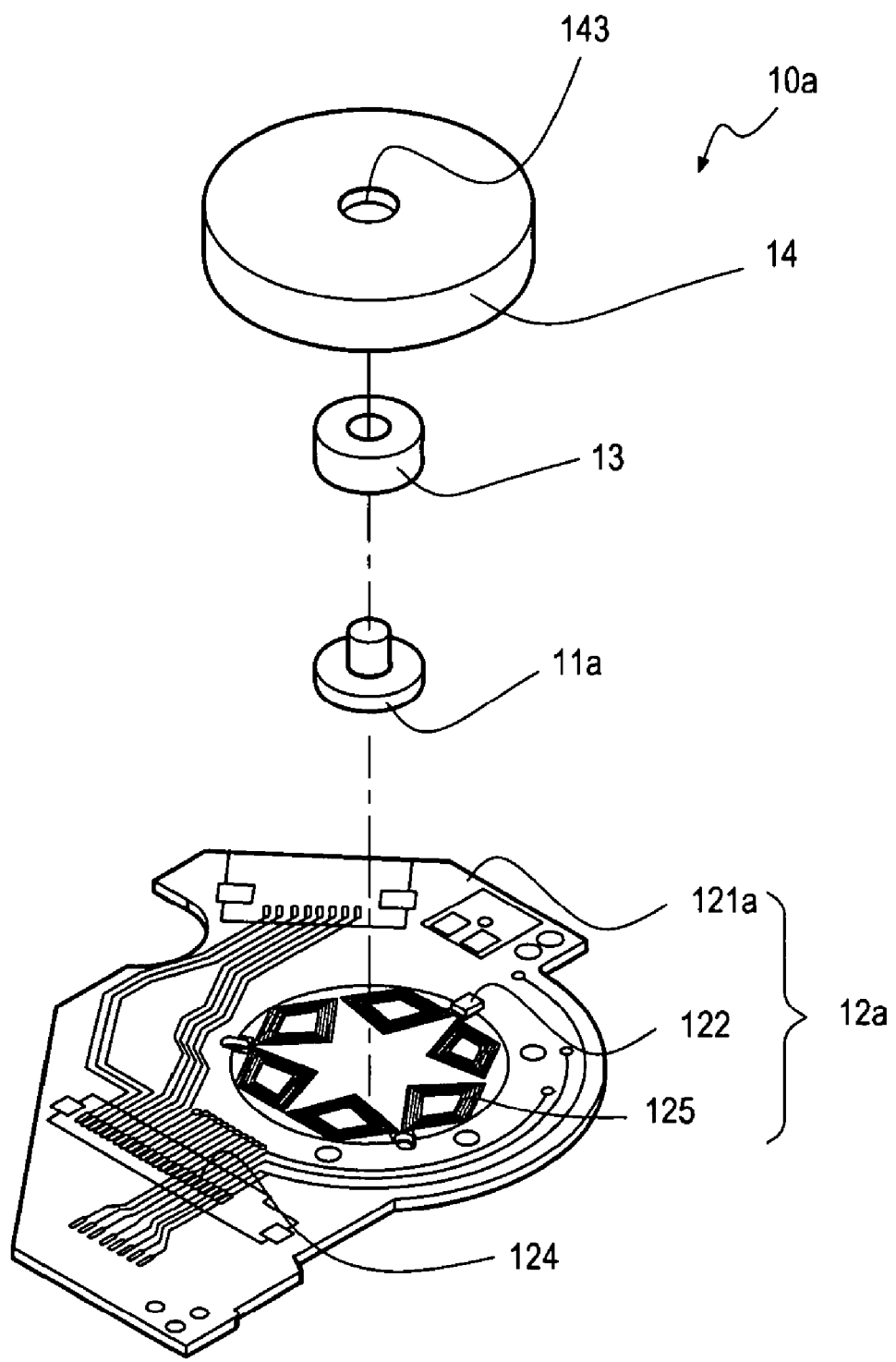
FIG. 2A is an exploded view of a motor module of a first embodiment in the present invention.
Figure 2B:
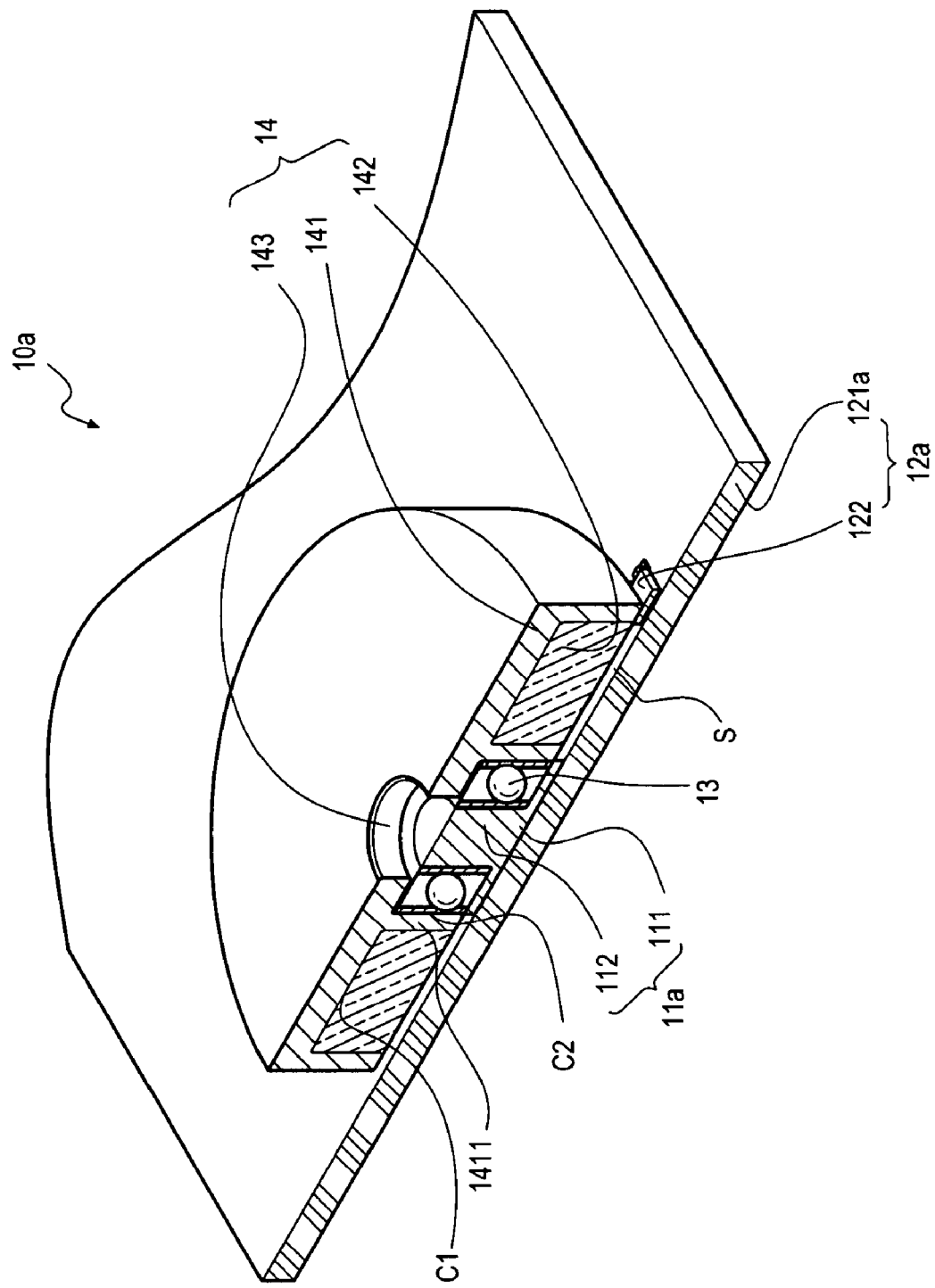
FIG. 2B is a 3D sectional view of a motor module of the first embodiment in the present invention.

As shown in FIGS. 2A and 2B, a motor module 10a of a first embodiment in the present invention comprises a bearing housing 11a, an electric unit 12a, a bearing 13, and a magnetic rotor unit 14. The bearing housing 11a has a loading base 111, and a protruding portion 112 is extending from one end of the loading base 111. In the FIGS of the embodiment, the diameter of the loading base 111 is larger than that of the protruding portion 112. However, in other practices, the diameter of the loading base 111 may equal to or smaller than that of the protruding portion 112. Also, the electric unit 12a includes a PCB 121a and a plurality of sensing elements 122. The aforesaid loading base 111 is disposed on the PCB 121a. In addition, by means of wirings, signal circuits 124 and motor windings 125 are formed on the PCB 121a, where is around the disposed loading base 111. And the aforesaid plurality of sensing elements 122 is disposed around the motor windings 125.

Figure 2C:
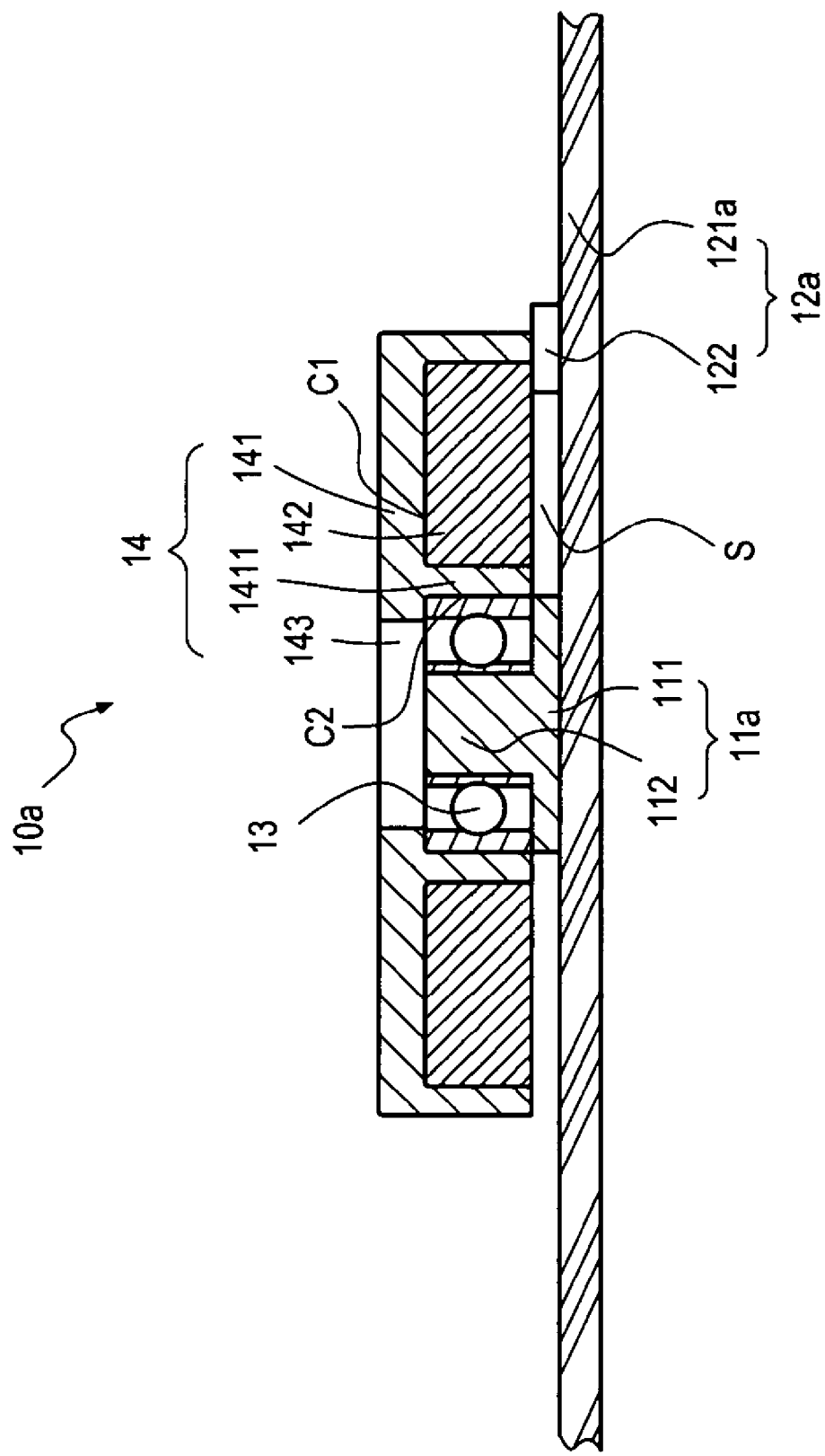
FIG. 2C is a sectional view of a motor module of the first embodiment in the present invention.

Referring to FIGS. 2A, 2B, and 2C, the bearing 13 is sleeved into outer surface of the protruding portion 112 of the bearing housing 11a, so that it can be stackedly disposed on the loading base 111. The bearing 13 is, but not limit to, Ball bearing, Hydrodynamic bearing, or Sleeve bearing. Moreover, the magnetic rotor unit 14 is stackedly disposed not only on the bearing 13 but also on the motor windings 125, keeping a gap S with the PCB. After the motor module 10a is assembled, when electric current passes the motor windings 125 of the electric unit 12a, the motor windings 125 and the magnetic rotor unit 14 generate a flux linkage induction, so as to drive the magnetic rotor unit 14 to rotate relative to the PCB 121a, and output power. Concretely speaking, the magnetic rotor unit 14 comprises an upper lid 141 and a permanent magnetic ring 142. The permanent magnetic ring 142 is disposed in the upper lid 141, and the upper lid 141 is stackedly disposed on the bearing 13, making the permanent magnetic ring 142 keep the gap S relative to the motor windings 125. Therefore, when electric current passes the motor windings 125 of the electric unit 12a, the motor windings 125 and the permanent magnetic ring 142 generate a flux linkage induction, so as to drive the magnetic rotor unit 14 to rotate.

The aforesaid upper lid 141 has a ring wall 1411, and the upper lid 141 is partitioned by the ring wall 1411 into a first covering area C1 and a second covering area C2. And the permanent magnetic ring 142 is disposed in the first covering area C1, and the second covering area C2 covers on the bearing 13. In addition, the upper lid 141 has an opening 143 relative to top of the protruding portion 112 of the bearing housing 11a.

The plurality of sensing elements 122 of the electric unit 12a is a Hall element, and number of the Hall element is determined by number of phase of power of the motor module 10a. In this embodiment, the motor module 10a is a three-phase motor, so that three Hall elements are used to form an electric angle of 120° between phases, disposed around the motor windings 125. Therefore, when the magnetic rotor unit 14 is rotating, it can be sensed by the Hall elements, and the power-on-state of the motor windings 125 can be switched by the motor module, so as to maintain the generated flux linkage induction between the motor windings 125 and the magnetic rotor unit 14 and drive the magnetic rotor unit 14 to continually rotate.

In addition, there is another profile of the motor module in the first embodiment. Here, the motor windings 125 of the aforesaid electric unit 12a are adapted to act as sensing element 122. Then a sensing signal sensed by the motor windings 125 is transmitted to a sensorless control IC (not shown) of a PCB 121a. Therefore, when the magnetic rotor unit 14 is rotating, the power-on-state of the motor windings 125 can be switched, so as to maintain the generated flux linkage induction between the motor windings 125 and the magnetic rotor unit 14 and drive the magnetic rotor unit 14 to continually rotate.

The wiring method of the PCB 121a for forming the signal circuits 124 and the motor winding 125 is a semiconductor wiring method. The wiring method is selected from a group comprising a screen printing method, a photolithography method, an ink-jet printing method, an imprinting printing, an electro forming method, or any method combination thereof. Besides, the motor windings 125 have multiple layers of wires.

Figure 3A:
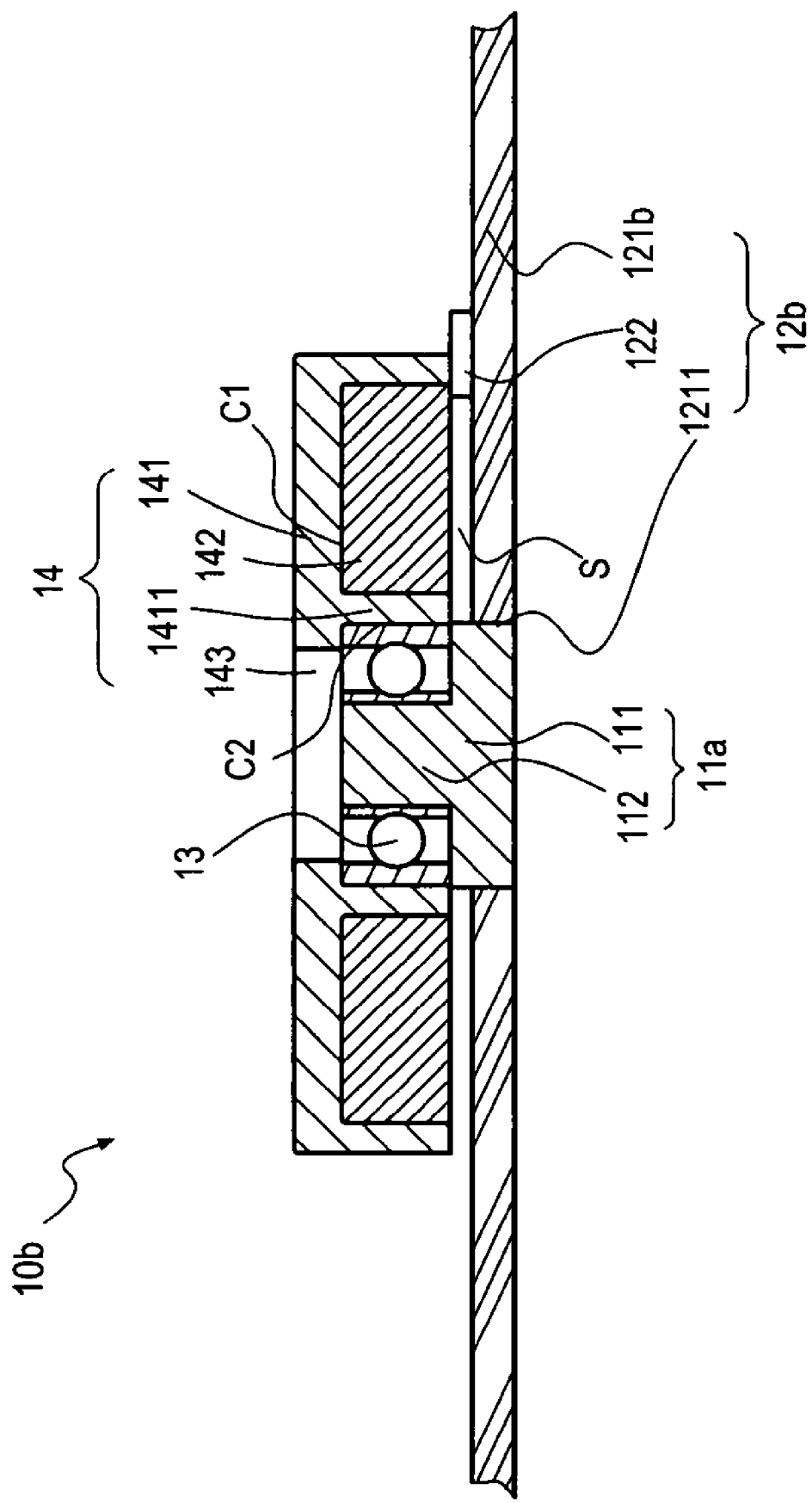
FIG. 3A is a first profile of a motor module of a second embodiment in the present invention.
Figure 3B:
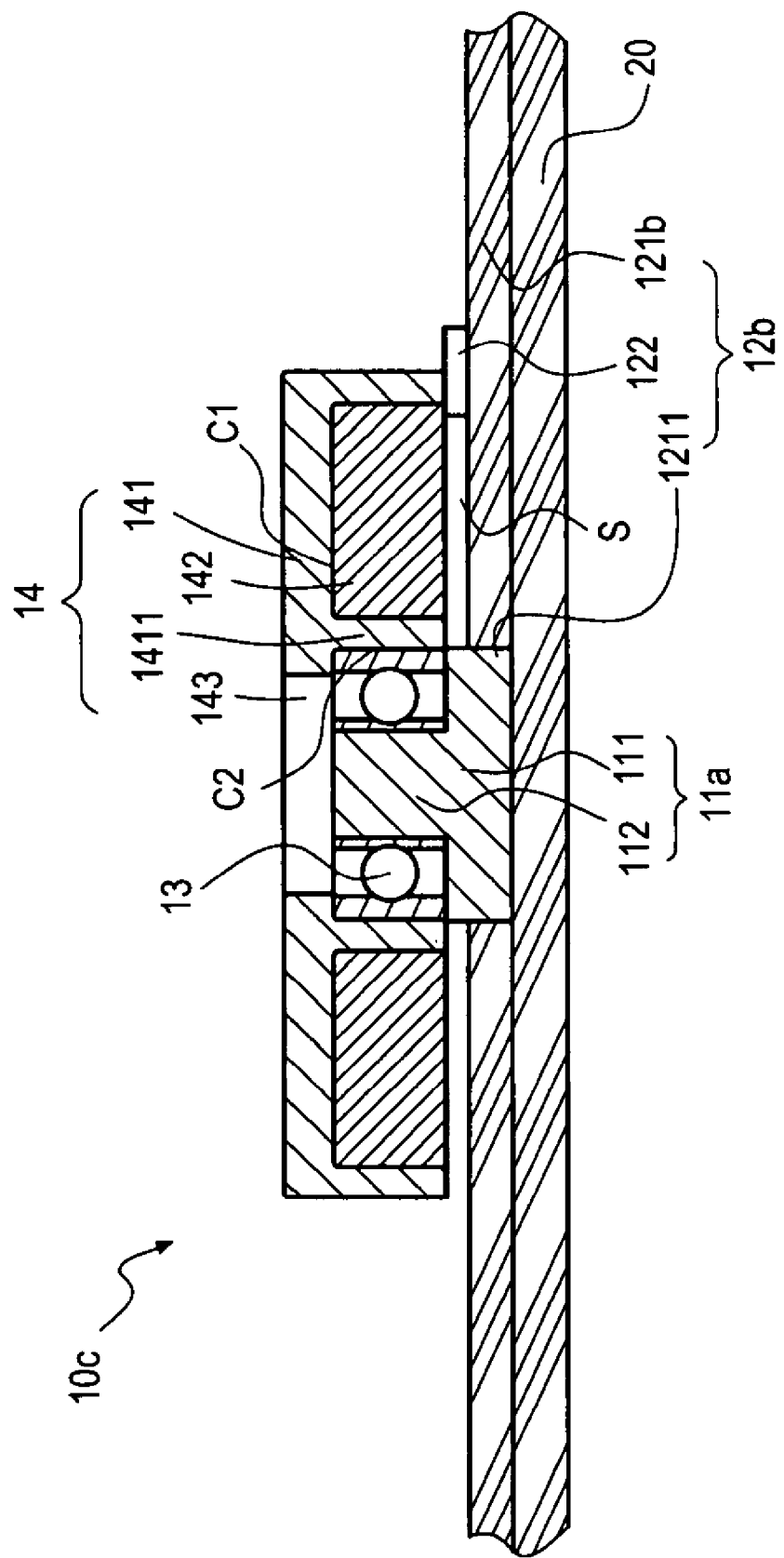
FIG. 3B is a second profile of a motor module of the second embodiment in the present invention.

Referring to FIG. 3A, in the motor module 10a of the first embodiment, the PCB 121b of the electric unit 12b further has a through hole 1211, so that the loading base 111 can be disposed in the through hole 1211 and combined to the PCB 121b, so as to constitute a motor module of a second embodiment of the present invention. And another profile of the motor module 10b of the second embodiment can further include a bottom plate 20 to carry the PCB 121b, so as to constitute the motor module 10c as shown in FIG. 3B.

Figure 4:
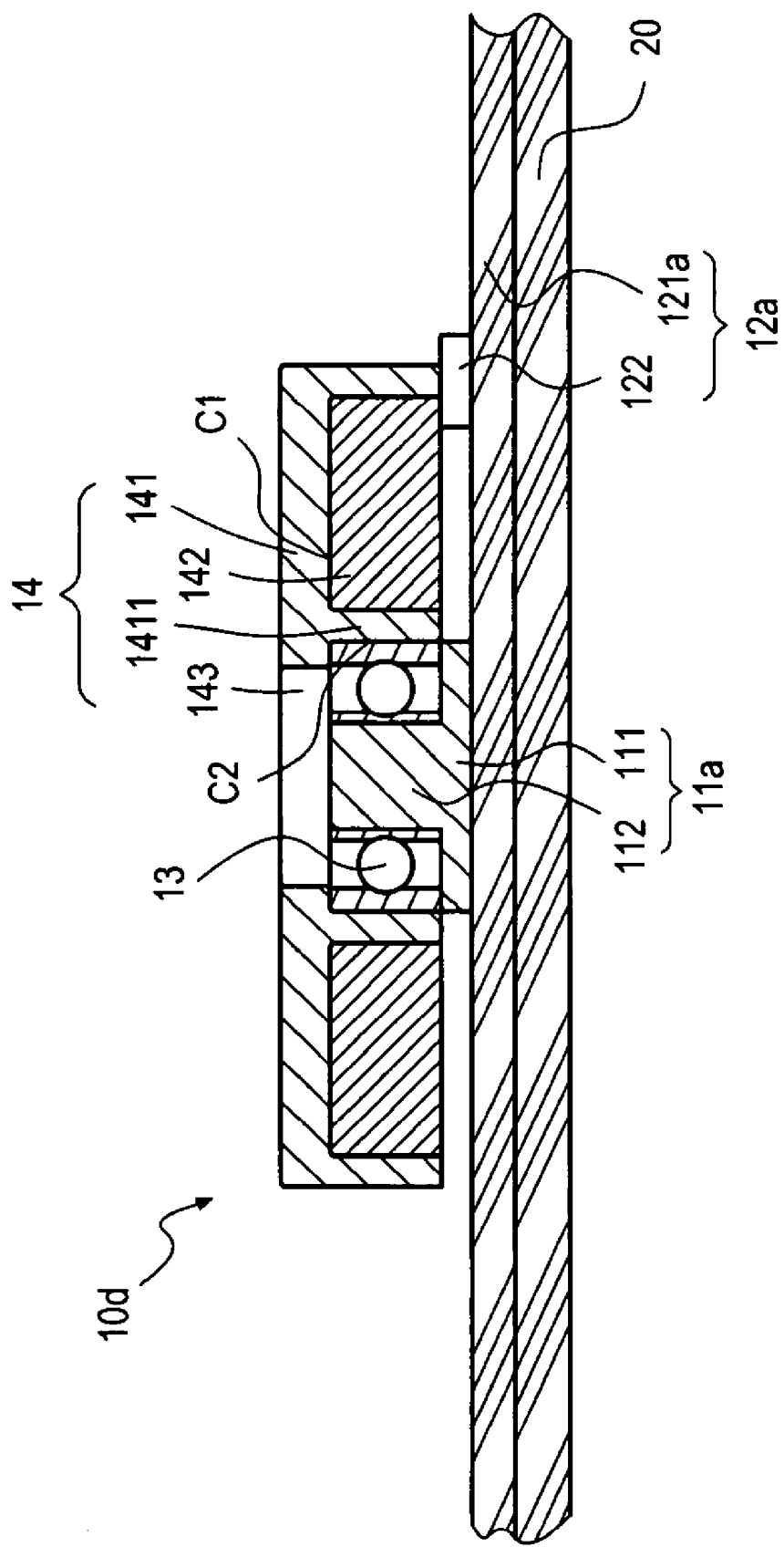
FIG. 4 is a sectional view of a motor module of a third embodiment in the present invention.

Referring to FIG. 4, the motor module 10a in the first embodiment further has a bottom plate 20, to carry the PCB 121b and constitute the motor module 10d of a third embodiment of the present invention.

Figure 5:
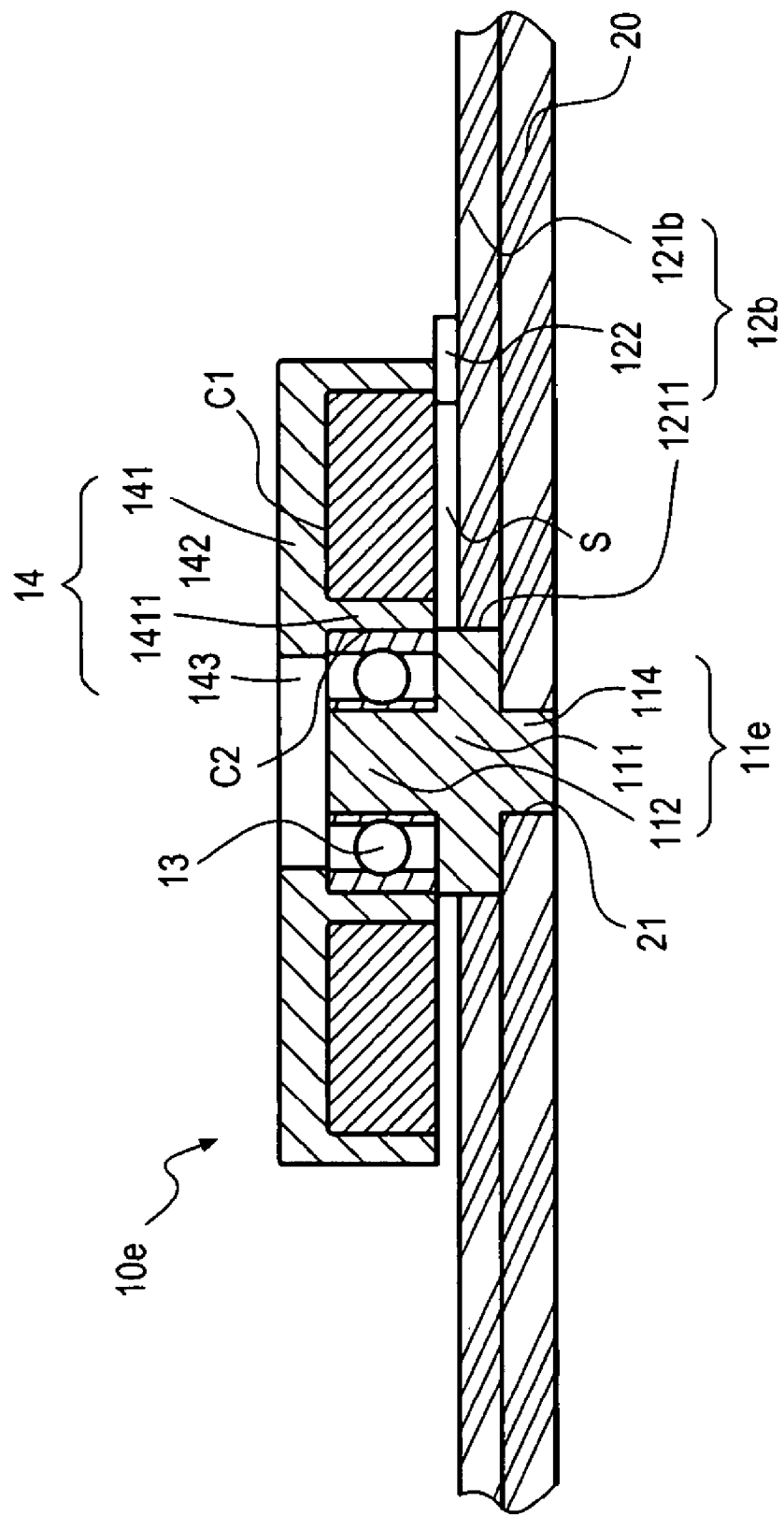
FIG. 5 is a sectional view of a motor module of a fourth embodiment in the present invention.

Referring to FIG. 5, it is a motor module 10e of a fourth embodiment of the present invention, wherein the bottom plate 20 has a punch hole 21, where is corresponding to the through hole 1211 of the PCB 121b. One end of the loading base 111 has a mounting portion 114 extended therefrom. That is, the bearing housing 11e further includes a mounting portion 114. Therefore, by inserting the mounting portion 114 into the punch hole 21 of the bottom plate 20, the bearing housing 11e can be inserted into the through hole 1211 of the PCB 121b and stackedly disposed on the bottom plate 20. Besides, because the loading base 111 is disposed on the through hole 1211, it can be combined to the PCB 121b.

Figure 6:
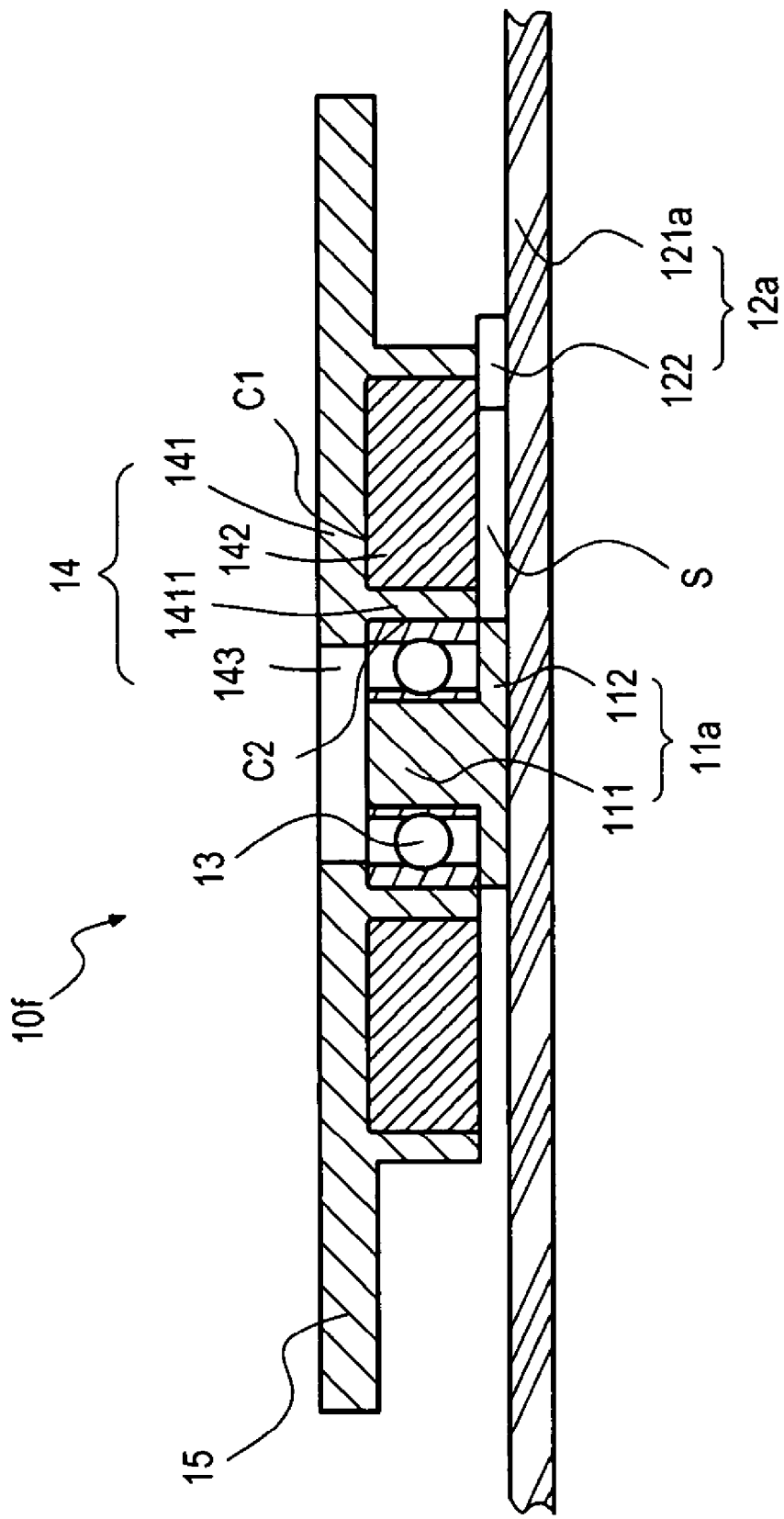
FIG. 6 is a sectional view of a motor module of a fifth embodiment in the present invention.

Referring to FIG. 6, the magnetic rotor unit 14 of the motor module 10a of the first embodiment can be disposed with a carrier 15. In the embodiment, the carrier 15 is disposed on the upper lid 141, and the carrier 15 can be used to carry an optical disk, which is the motor module 10f a fifth embodiment of the present invention.

Figure 7:
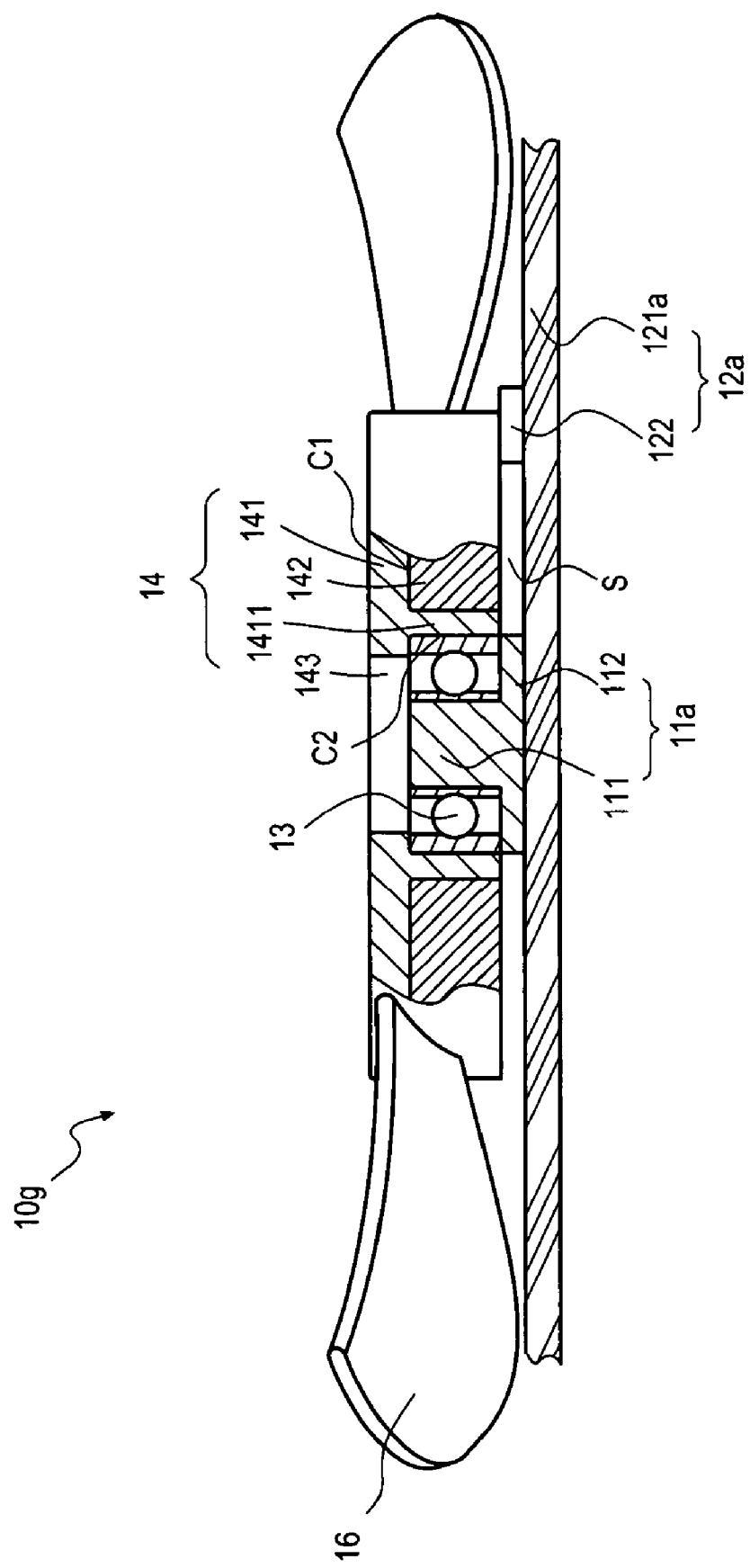
FIG. 7 is a sectional view of a motor module of a sixth embodiment in the present invention.

Referring to FIG. 7, the magnetic rotor unit 14 of the motor module 10a of the first embodiment can be disposed with a group of blades 16. In the embodiment, the blades 16 are disposed on the upper lid 141, so as to constitute a motor module 10g with micro fan of a sixth embodiment of the present invention.

Figure 8:
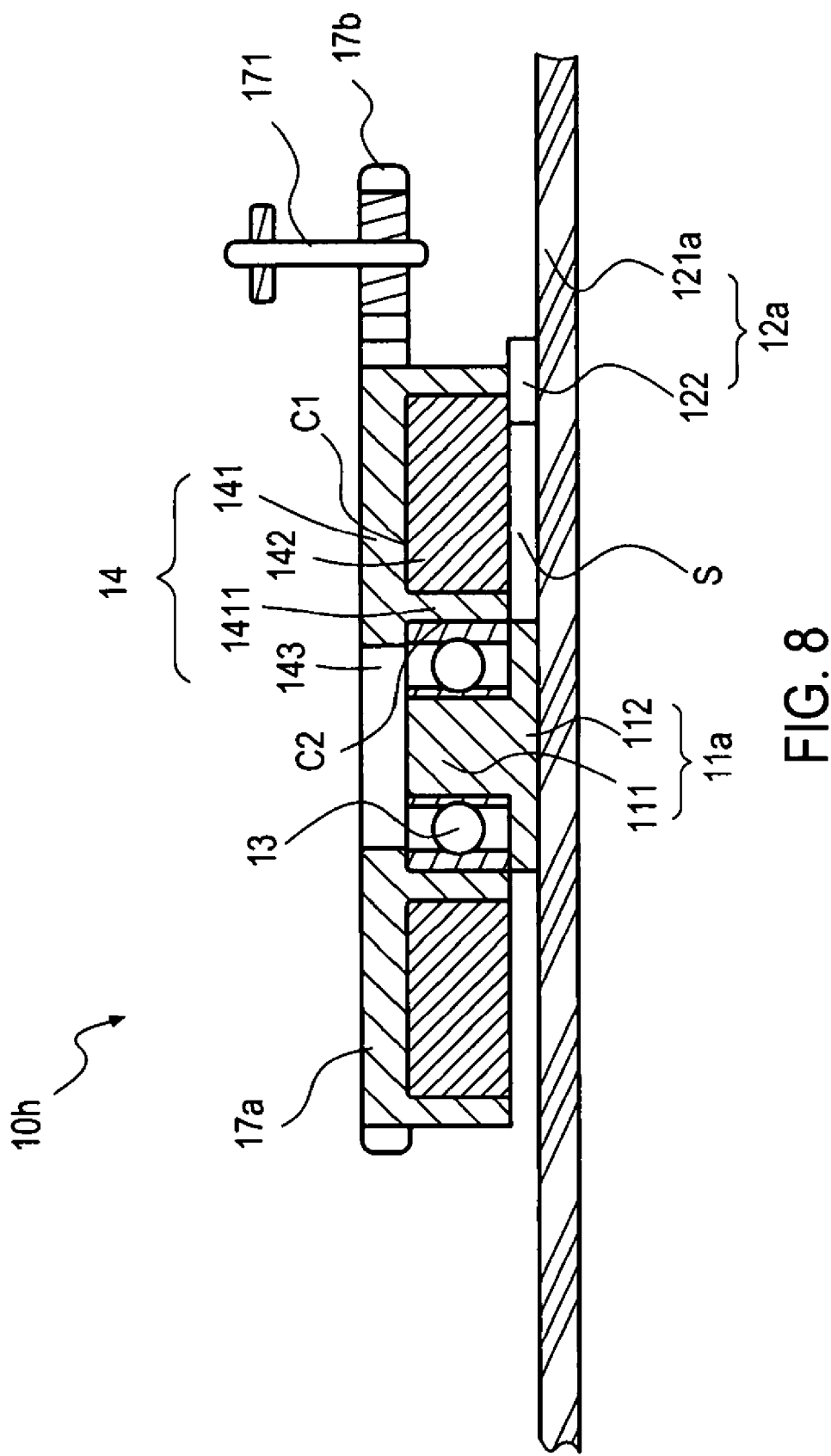
FIG. 8 is a sectional view of a motor module of a seventh embodiment in the present invention.

Referring to FIG. 8, the magnetic rotor unit 14 of the motor module 10a of the first embodiment can be disposed with a gear 17a. In the embodiment, the gear 17a is disposed on the upper lid 141, and the gear 17a can cooperate with a gear 17b to constitute a motor module 10h with gear set of a seventh embodiment of the present invention, wherein the gear 17b further has a spindle 171 for outputting power.

Figure 9:
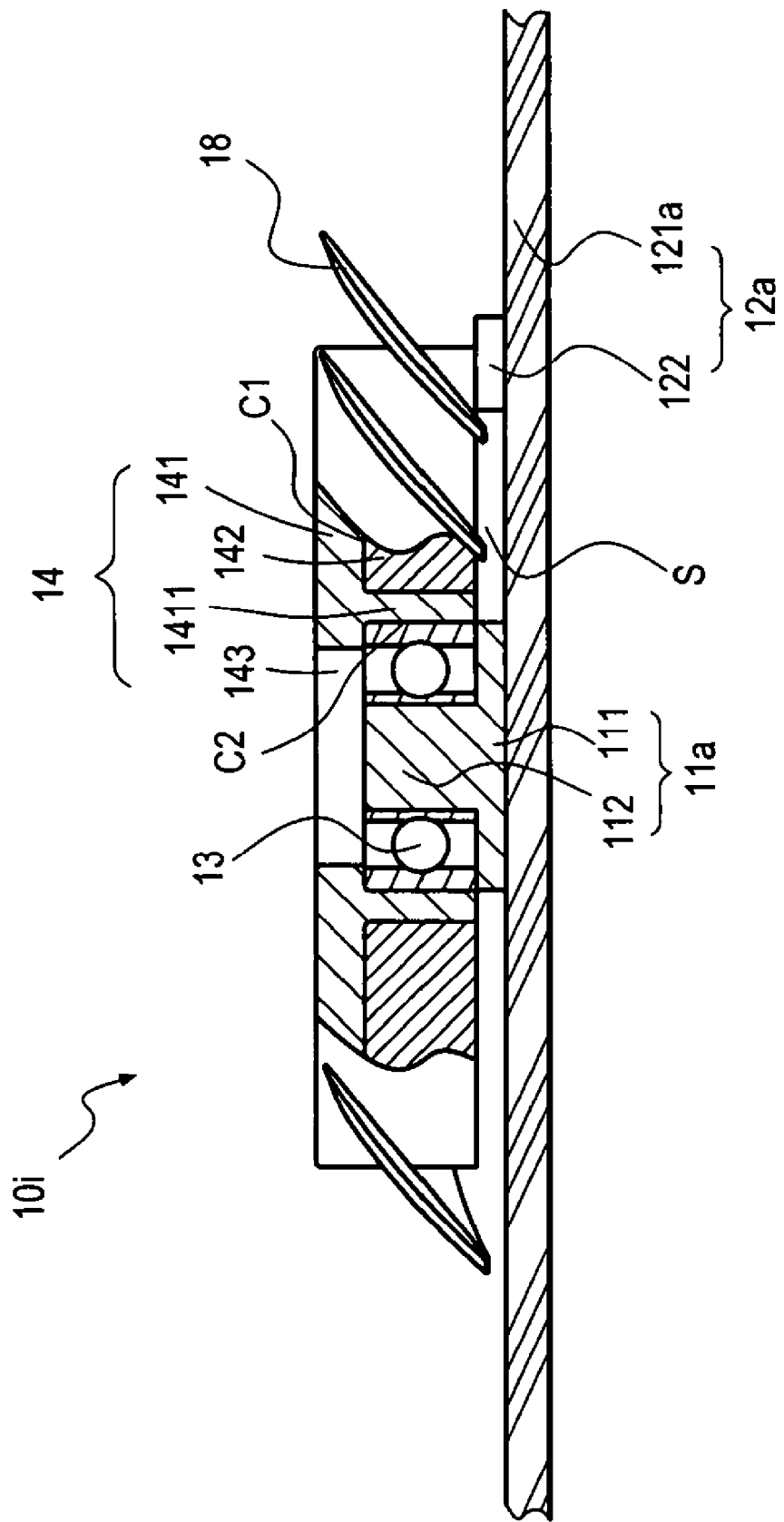
FIG. 9 is a partial sectional view of a motor module of an eighth embodiment in the present invention.

Referring to FIG. 9, the magnetic rotor unit 14 of the motor module 10a of the first embodiment can be disposed with a plurality of pump vanes 18. In the embodiment, the pump vanes 18 are disposed on the upper lid 141, so as to constitute a motor module 10i with flow distribution function of an eighth embodiment of the present invention.

Figure 10:
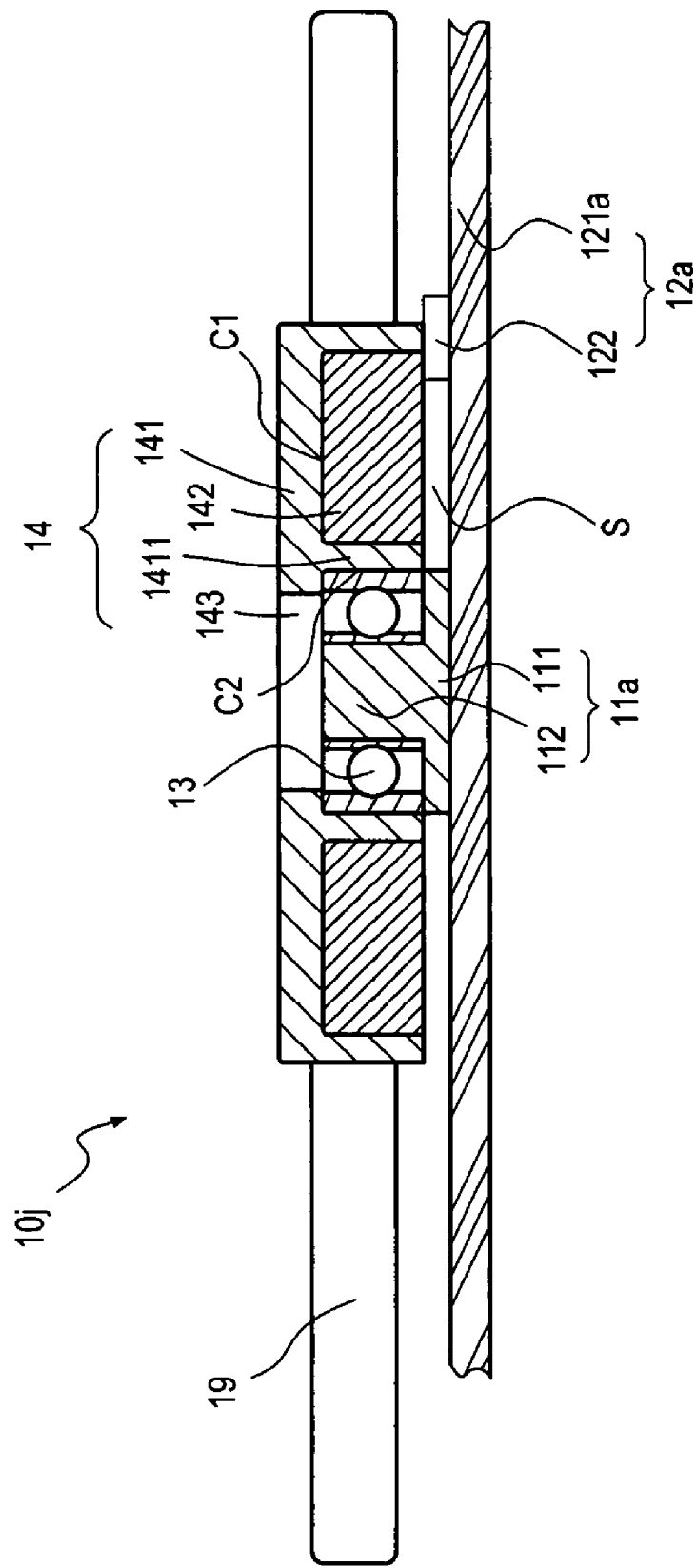
FIG. 10 is a sectional view of a motor module of a ninth embodiment in the present invention.

Referring to FIG. 10, the magnetic rotor unit 14 of the motor module 10a of the first embodiment can be disposed with an eccentric wheel 19. In the embodiment, the eccentric wheel 19 is disposed on the upper lid 141. And because the magnetic rotor unit 14 drives the eccentric wheel 19 to rotate, they can constitute a motor module 10j with vibration function of a ninth embodiment of the present invention.

Figure 11:
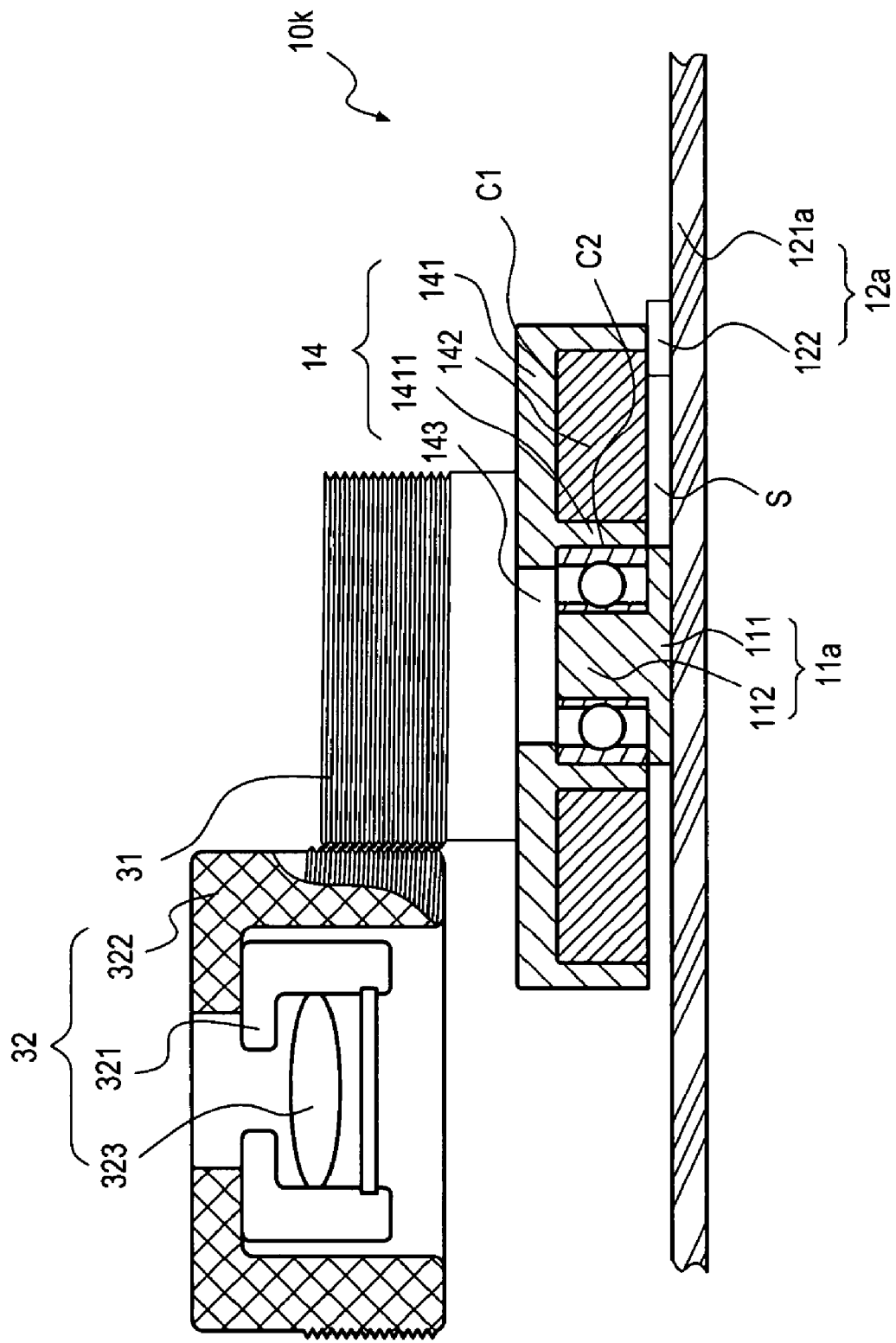
FIG. 11 is a sectional view of a motor module of a tenth embodiment in the present invention.

Referring to FIG. 11, the magnetic rotor unit 14 of the motor module 10a of the first embodiment can be disposed with a driving device 31. In the embodiment, the driving device 31 is disposed on the upper lid 141, and the driving device 31 can assembly with an auto focus module 32. The driving device 31 can be driven by connecting with the magnetic rotor unit 14, and the driving method can be achieved by means of thread groove, gear structure, or cam structure, so that the auto focus module 32 can expand and contract. That is, the auto focus module 32 comprising a lens barrel 321, an actuator 322, and a lens 323 can be driven to expand and contract to achieve focus. Therefore, a motor module 10k with auto focus function of a tenth embodiment can be constituted by the magnetic rotor unit 14 driving the drive device 31 to control the auto focus module 32.

Except the motor module 10a of the first embodiment can be taken as varied application examples, the motor modules of the second embodiment to the fourth embodiment can also be configured in the same way as that of the first embodiment in practice.

Figure 12A:
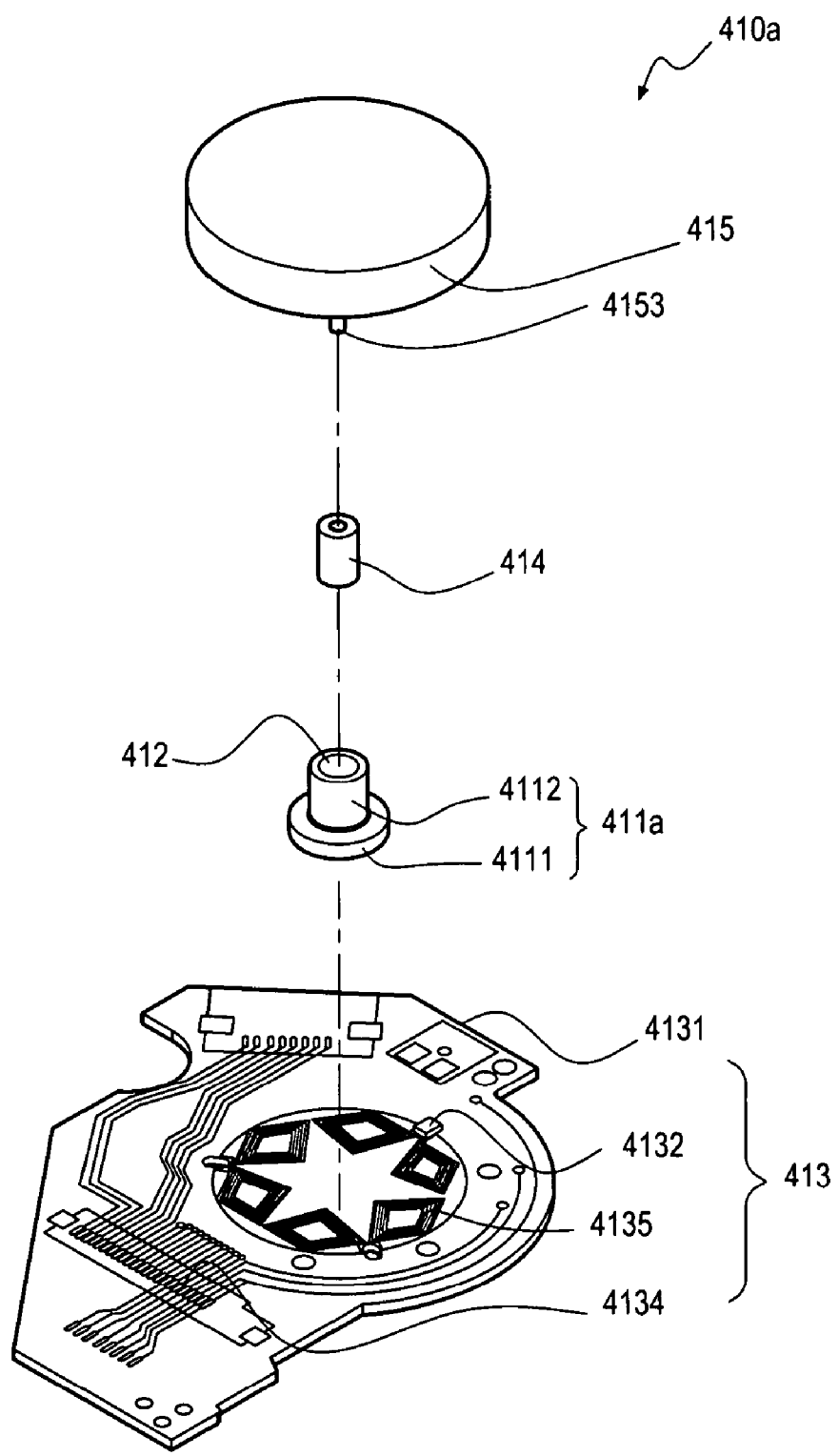
FIG. 12A is an exploded view of a motor module of an eleventh embodiment in the present invention.
Figure 12B:
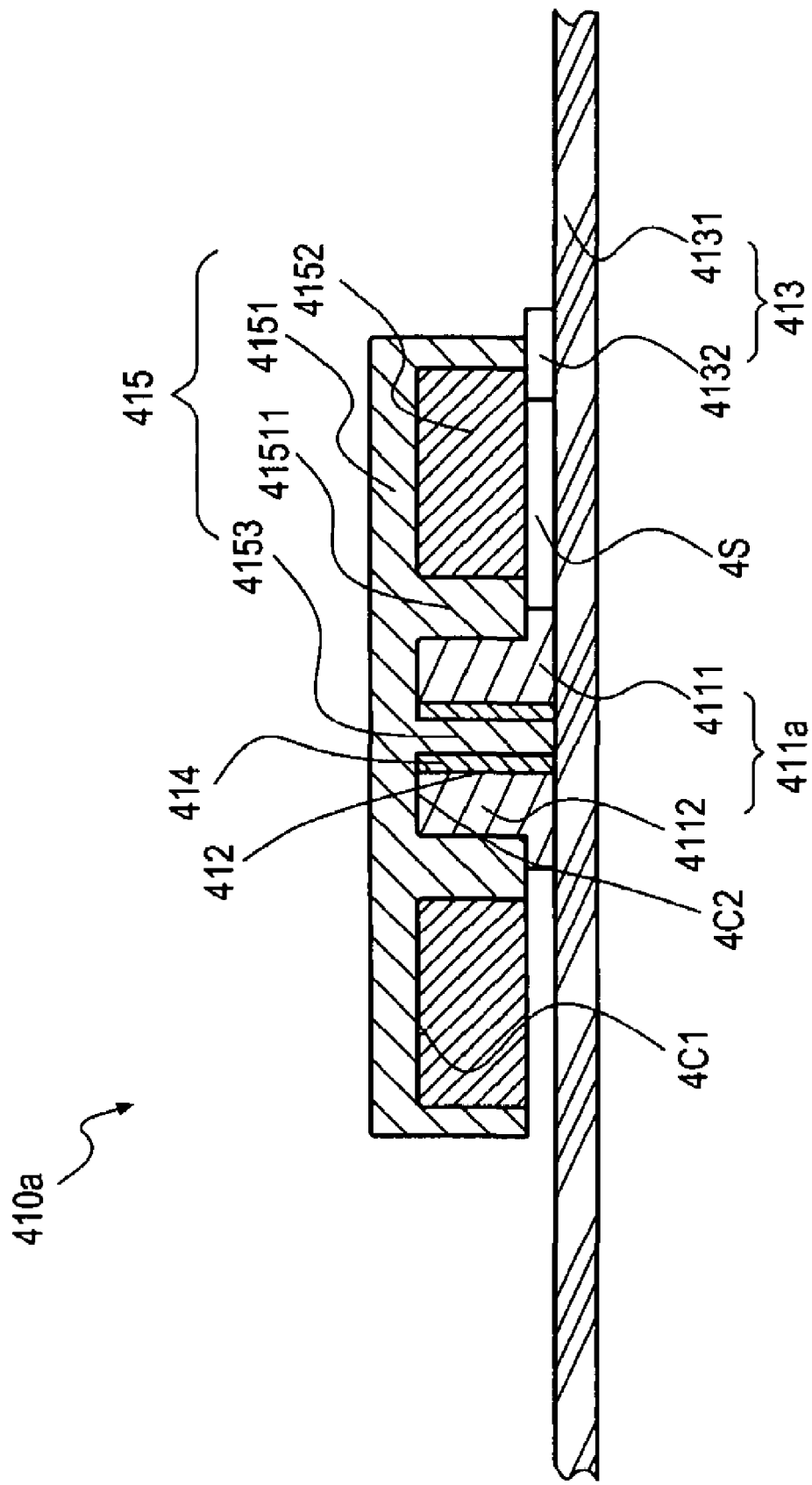
FIG. 12B is a sectional view of the motor module of the eleventh embodiment in the present invention.

Referring to FIGS. 12A and 12B, in the motor module of the present invention, the motor module 410a in an eleventh embodiment comprises a bearing housing 411a, a hole 412, an electric unit 413, a bearing 414, and a magnetic rotor unit 415. The bearing housing 411a has a loading base 4111, and one end of the loading base 4111 has a protruding portion 4112. In the FIGS of the embodiment, the diameter of the loading base 4111 is larger than that of the protruding portion 4112. However, in other practices, the diameter of the loading base 4111 may equal to or smaller than that of the protruding portion 4112. Besides, the hole 412 penetrates the entire protruding portion 4112, and extends and passes through the loading base 4111 for disposing the bearing 414 therein. In other applications, the hole 412 may be a step-shaped hole, and penetrates the entire protruding portion 4112 and the loading base 4111 for disposing the bearing 414 therein. Moreover, the electric unit 413 comprises a PCB 4131 and a plurality of sensing elements. The aforesaid bearing housing 411a is stackedly disposed on the PCB 4131, wherein by means of wirings, signal circuits 4134 and motor windings 4135 are formed on the PCB 4131, where is around the disposed bearing housing 411a, and the sensing elements 4132 are disposed around the motor windings 4135 of the PCB 4131.

Referring to FIGS. 12A and 12B again, the bearing 414 is inserted into the hole 412 passing through the entire protruding portion 4112 and loading base 4111. The bearing 414 is, but not limit to, Ball bearing, Hydrodynamic bearing, or Sleeve bearing. Moreover, the magnetic rotor unit 415 is stackedly disposed not only on the loading base 4111 but also on the motor windings 4135, keeping a gap 4S with the PCB 4131. After the motor module 410a is assembled, when electric current passes the motor windings 4135 of the electric unit 413, the motor windings 4135 and the magnetic rotor unit 415 generate a flux linkage induction, so as to drive the magnetic rotor unit 415 to rotate relative to the PCB 4131, and output power. Concretely speaking, the magnetic rotor unit 415 comprises an upper lid 4151 and a permanent magnetic ring 4152. The permanent magnetic ring 4152 is disposed in the upper lid 4151, and the upper lid 4151 further includes a core axis 4153. The core axis 4153 is disposed in the bearing 414, making the permanent magnetic ring 4152 keep the gap 4S relative to the motor windings 4135. Therefore, when electric current passes the motor windings 4135 of the electric unit 413, the motor windings 4135 and the permanent magnetic ring 4152 generate a flux linkage induction, so as to drive the magnetic rotor unit 415 to rotate, and the core axis 4153 moves together.

The aforesaid upper lid 4151 has a ring wall 41511, and the upper lid 4151 is partitioned by the ring wall 41511 into a third covering area 4C1 and a fourth covering area 4C2. And the permanent magnetic ring 4152 is disposed in the third covering area 4C1, and the fourth covering area 4C2 covers on the protruding portion 4112 of the bearing housing 411a.

The plurality of sensing elements 4132 of the electric unit 413 is a Hall element, and number of the Hall element is determined by number of phase of power of the motor module 410a. In this embodiment, the motor module 410a is a three-phase motor, so that three Hall elements are used to form an electric angle of 120° between phases, disposed around the motor windings 4135. Therefore, when the magnetic rotor unit 415 is rotating, it can be sensed by the Hall elements, and the power-on-state of the motor windings 4135 can be switched by the motor module, so as to maintain the generated flux linkage induction between the motor windings 4135 and the magnetic rotor unit 415 and drive the magnetic rotor unit 415 to continually rotate.

In addition, there is another profile of the motor module 410a in the eleventh embodiment. Here, the motor windings 4135 of the aforesaid electric unit 413 are adapted to act as sensing element. Then a sensing signal sensed by the motor windings 4135 is transmitted to a sensorless control IC (not shown) of a PCB 4131. Therefore, when the magnetic rotor unit 415 is rotating, the power-on-state of the motor windings 4135 can be switched, so as to maintain the generated flux linkage induction between the motor windings 4135 and the magnetic rotor unit 415 and drive the magnetic rotor unit 415 to continually rotate.

The wiring method of the PCB 4131 for forming the signal circuits 4134 and the motor winding 4135 is a semiconductor wiring method. The wiring method is selected from a group comprising a screen printing method, a photolithography method, an ink-jet printing method, an imprinting printing, an electro forming method, or any method combination thereof. Besides, the motor windings 4135 have multiple layers of wires.

Figure 13A:
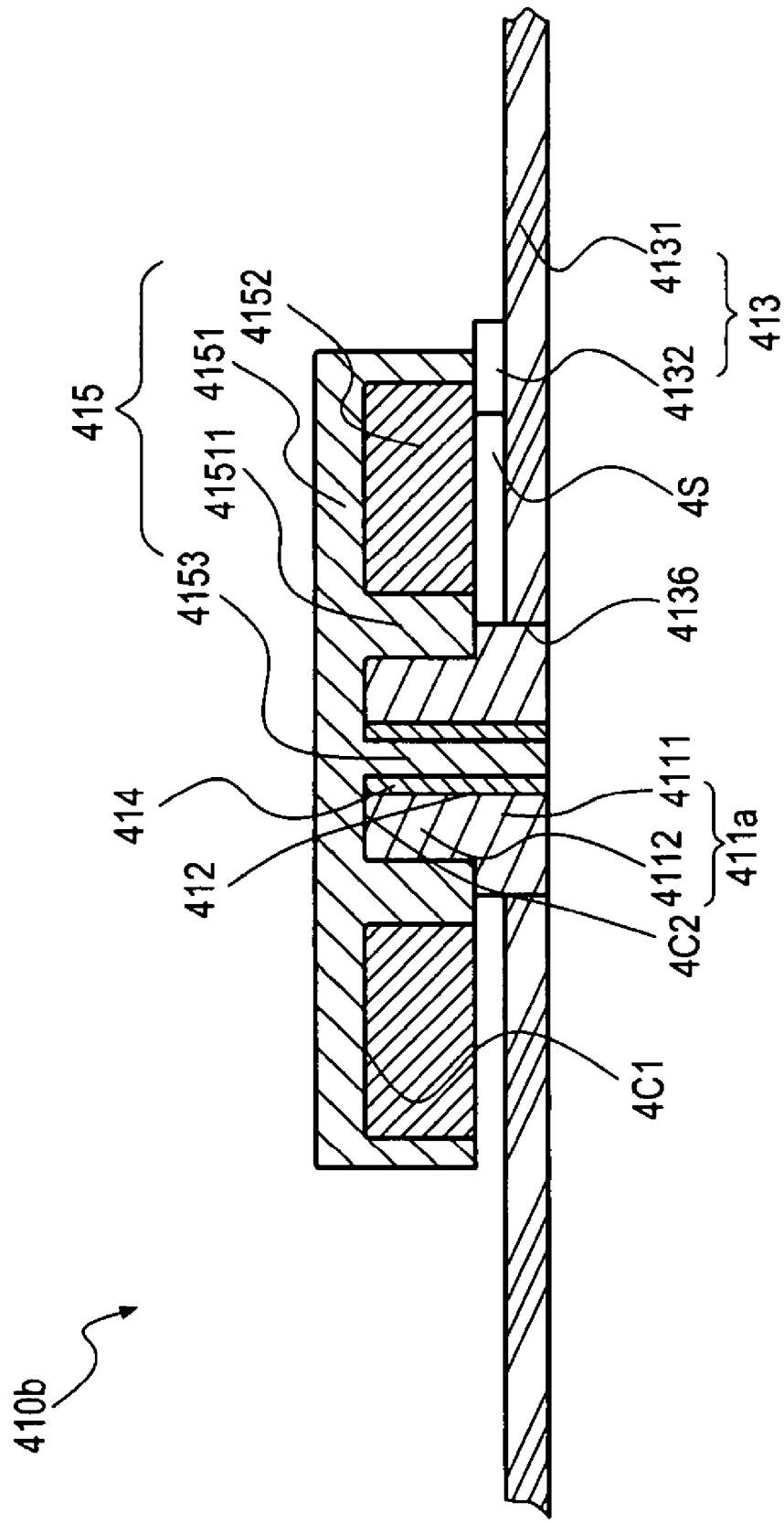
FIG. 13A is a sectional view of the motor module of a twelfth embodiment in the present invention.
Figure 13B:
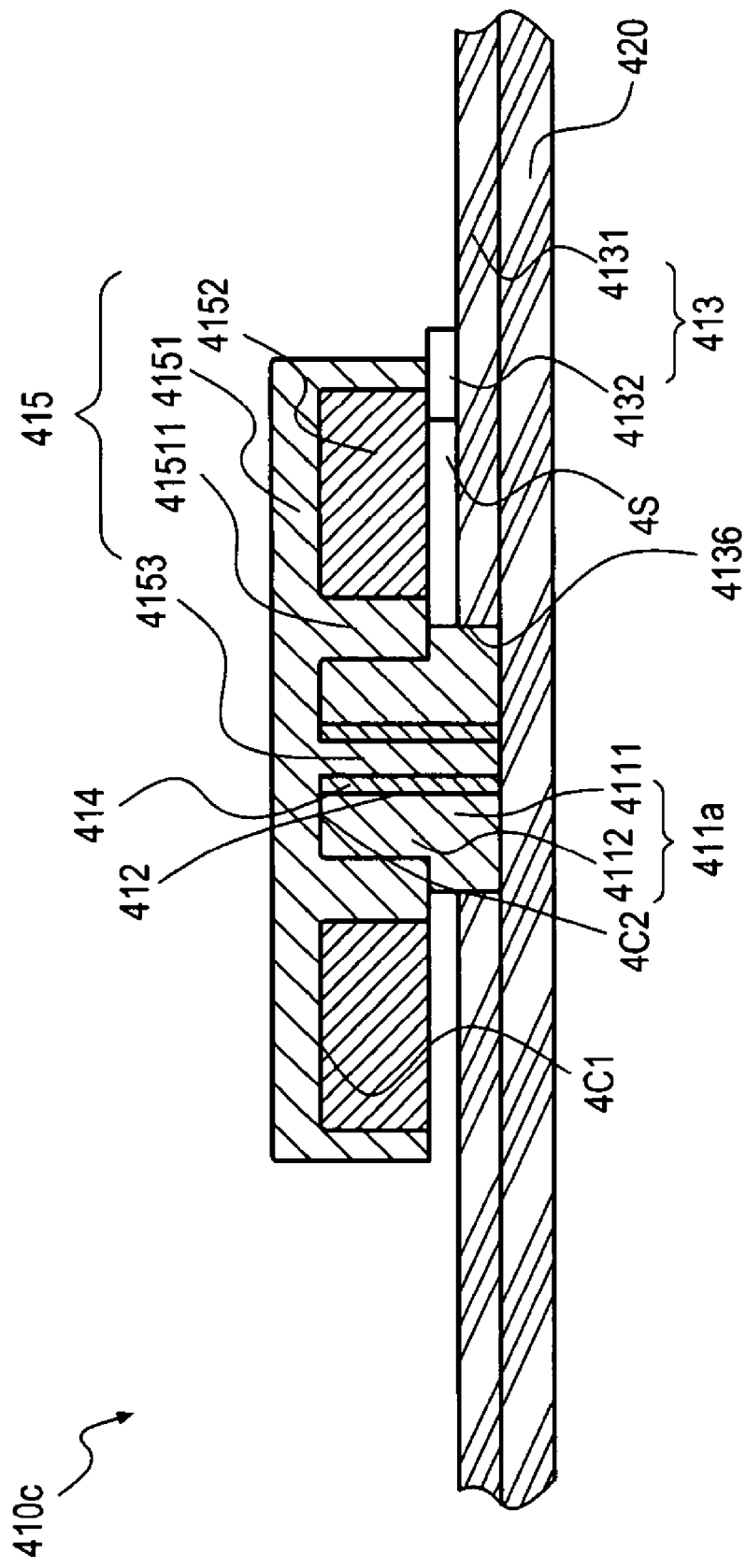
FIG. 13B is a sectional view of the motor module of a thirteenth embodiment in the present invention.

Referring to FIG. 13A, in the motor module 410a of the eleventh embodiment, the PCB 4131 further has a through hole 4136, so that the loading base 4111 can be disposed in the through hole 4136 and combined to the PCB 4131, so as to constitute a motor module 410b of a twelfth embodiment of the present invention. And another profile of the motor module 410c is that the PCB 4131 can further include a bottom plate 420, so as to constitute the motor module 410c of the thirteenth embodiment.

Figure 14:
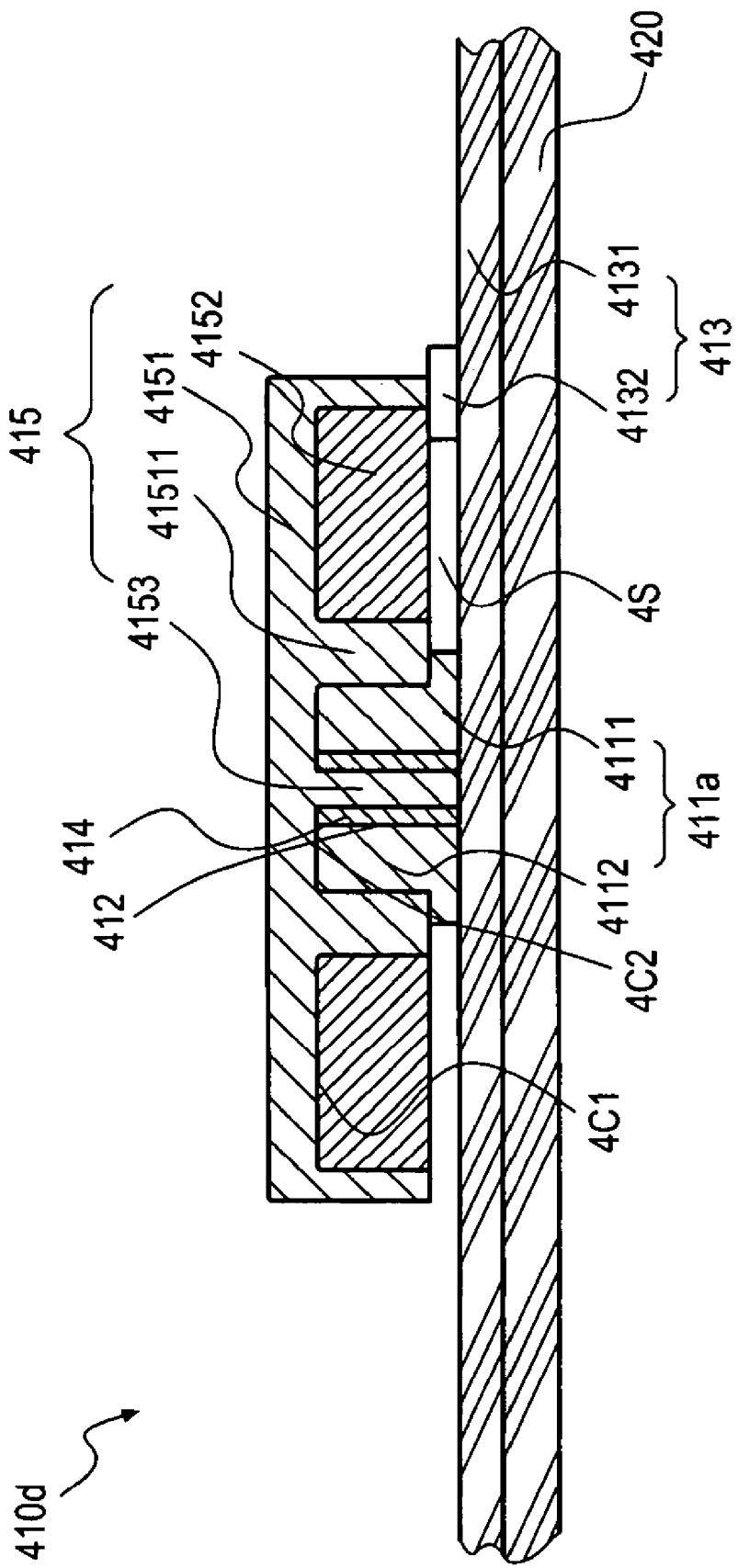
FIG. 14 is a sectional view of the motor module of a fourteenth embodiment in the present invention.

Referring to FIG. 14, the motor module 410a in the eleventh embodiment further has a bottom plate 420, to carry the PCB 4131 and constitute the motor module 410d of a fourteenth embodiment of the present invention.

Figure 15:
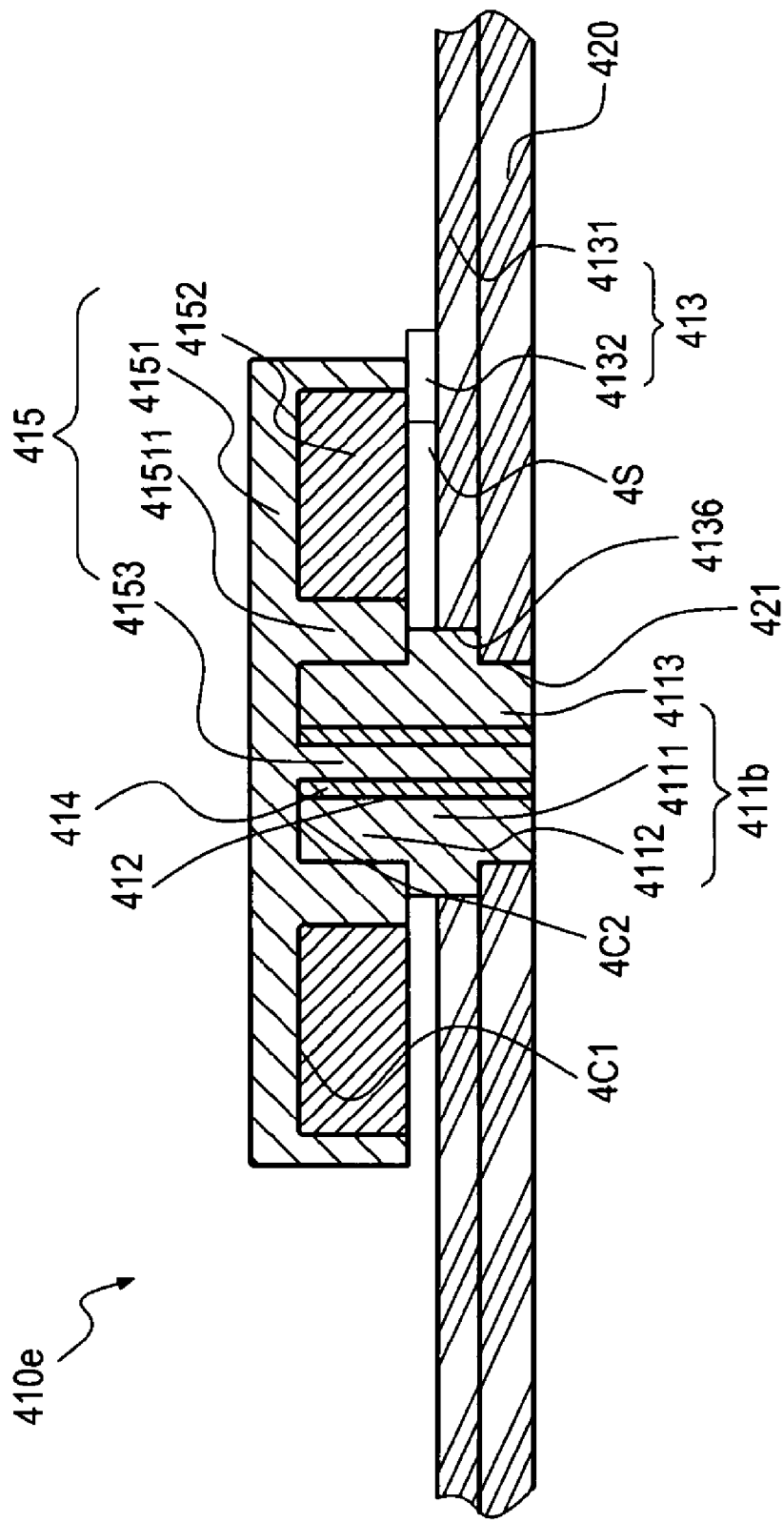
FIG. 15 is a sectional view of the motor module of a fifteenth embodiment in the present invention.

Referring to FIG. 15, in the motor module 410c of the thirteenth embodiment, one end of the loading base 4111 has at least one mounting portion 4113 extended therefrom, and the bottom plate 420 further includes a punch hole 421 corresponding to the mounting portion 4113. Therefore, by inserting the mounting portion 4113 into the punch hole 421, the bearing housing 411b can be inserted into the through hole 4136 of the PCB 4131, so that the loading base 4111 can be stackedly disposed on the bottom plate 420 and combined to the PCB 4131. And the bearing housing 411b is mounted to the bottom plate 420, so as to constitute a motor module 410e of a fifteenth embodiment of the present invention.

Figure 16A:
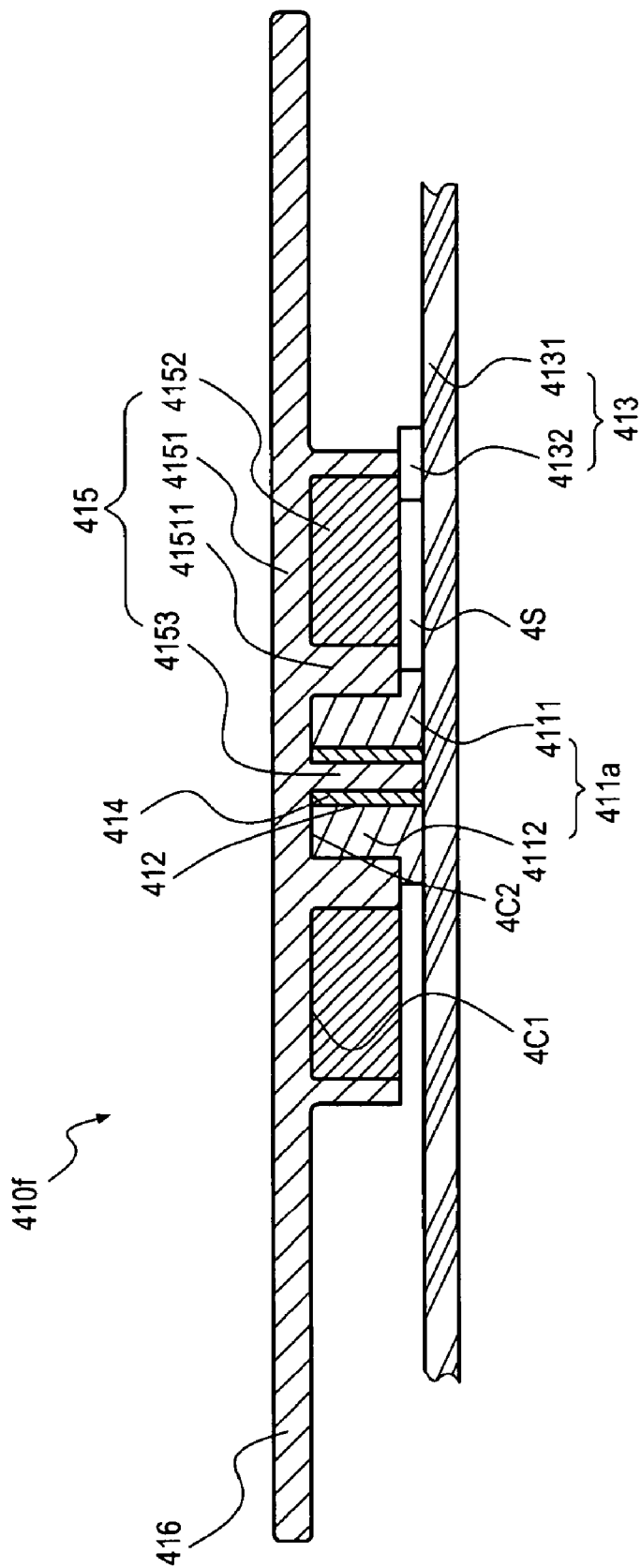
FIG. 16A is a sectional view of the motor module of a sixteenth embodiment in the present invention.
Figure 16B:
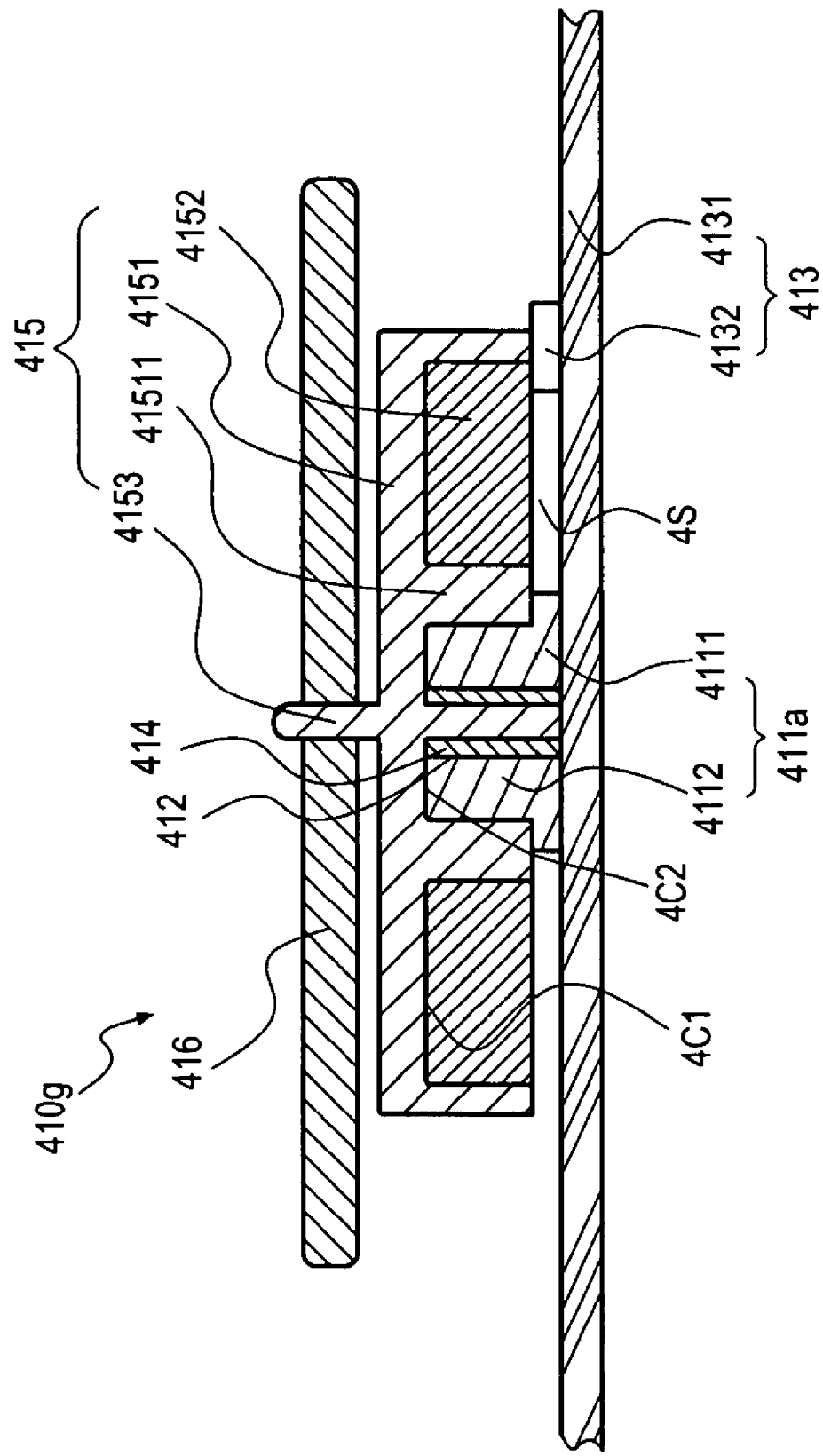
FIG. 16B is a sectional view of the motor module of a seventeenth embodiment in the present invention.

Referring to FIG. 16A, the magnetic rotor unit 415 of the motor module 410a of the eleventh embodiment can be disposed with a carrier 416, so that the carrier 416 can be used to carry an optical disk, which is a motor module 410f of a sixteenth embodiment of the present invention. Or, referring to FIG. 16B, a carrier 416 is disposed on the core axis 4153 for carrying an optical disk, so as to constitute a motor module 410g of a seventeenth embodiment of the present invention.

Figure 17A:
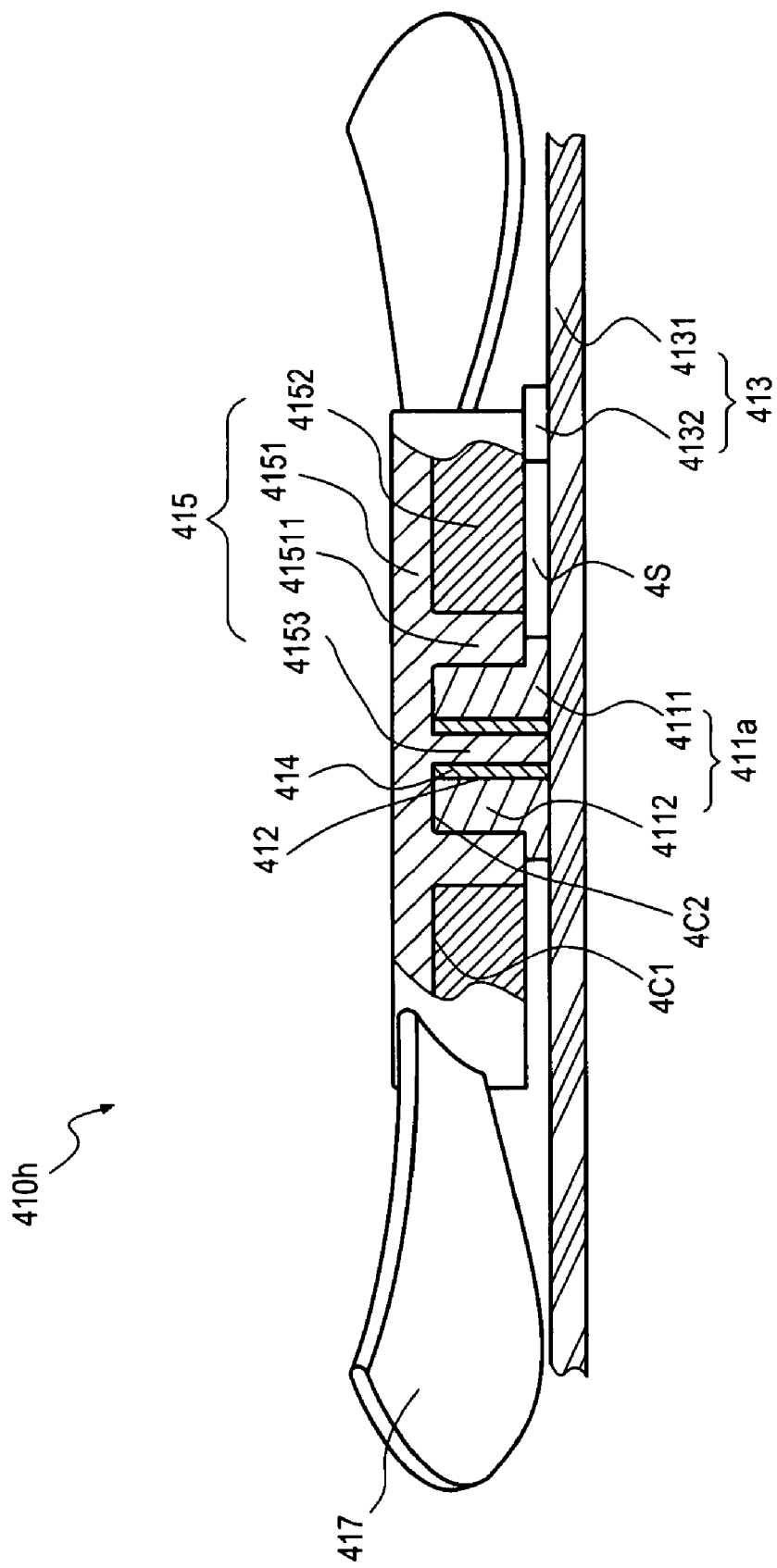
FIG. 17A is a sectional view of the motor module of an eighteenth embodiment in the present invention.
Figure 17B:
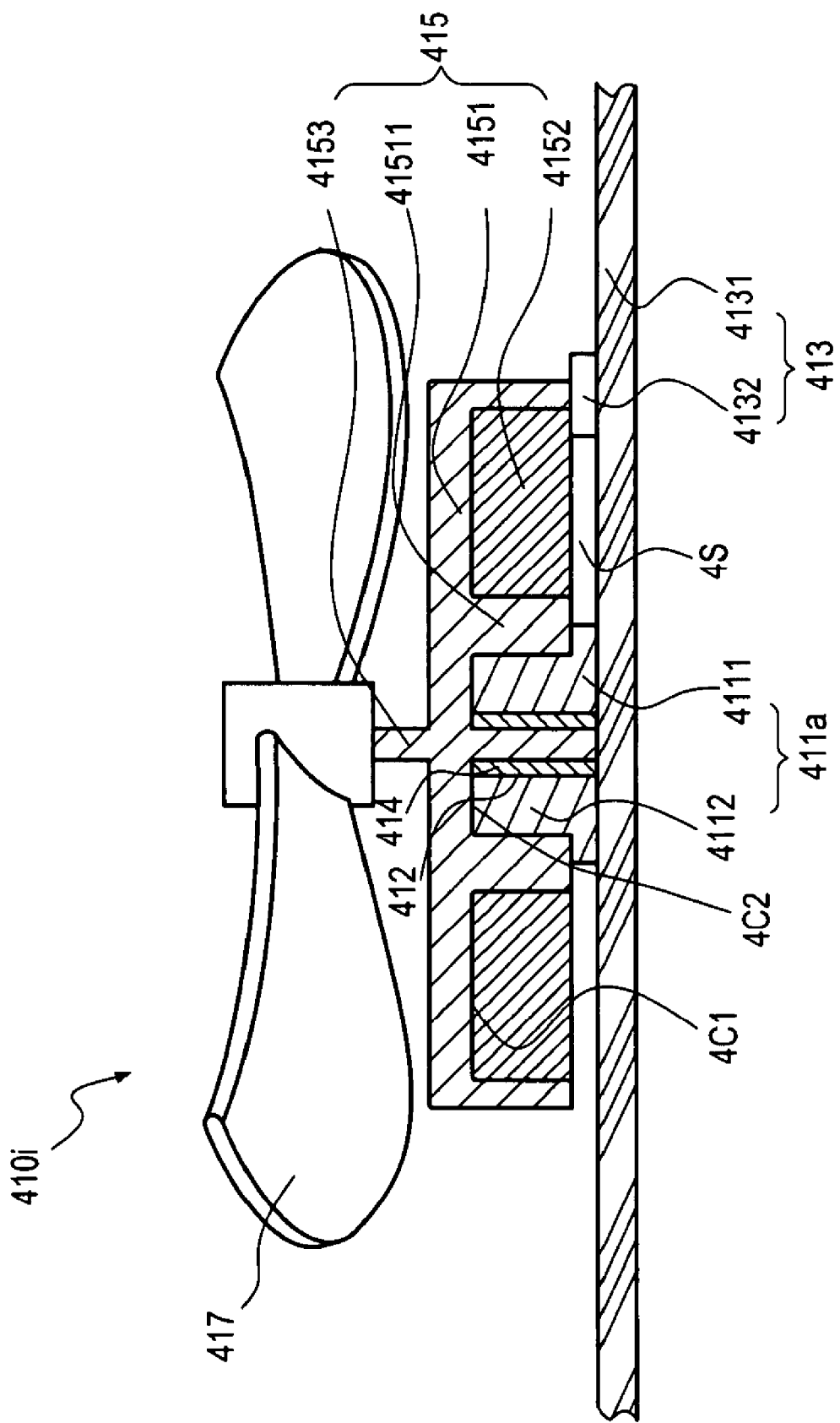
FIG. 17B is a sectional view of the motor module of a nineteenth embodiment in the present invention.

Referring to FIG. 17A, the magnetic rotor unit 415 of the motor module 410a of the eleventh embodiment can be disposed with a group of blades 417, so as to constitute a motor module 410h with micro fan of an eighteenth embodiment of the present invention. Or, referring to FIG. 17B, a group of blades 417 is disposed on the core axis 4153, so as to constitute a motor module 410i with micro fan of a nineteenth embodiment of the present invention.

Figure 18A:
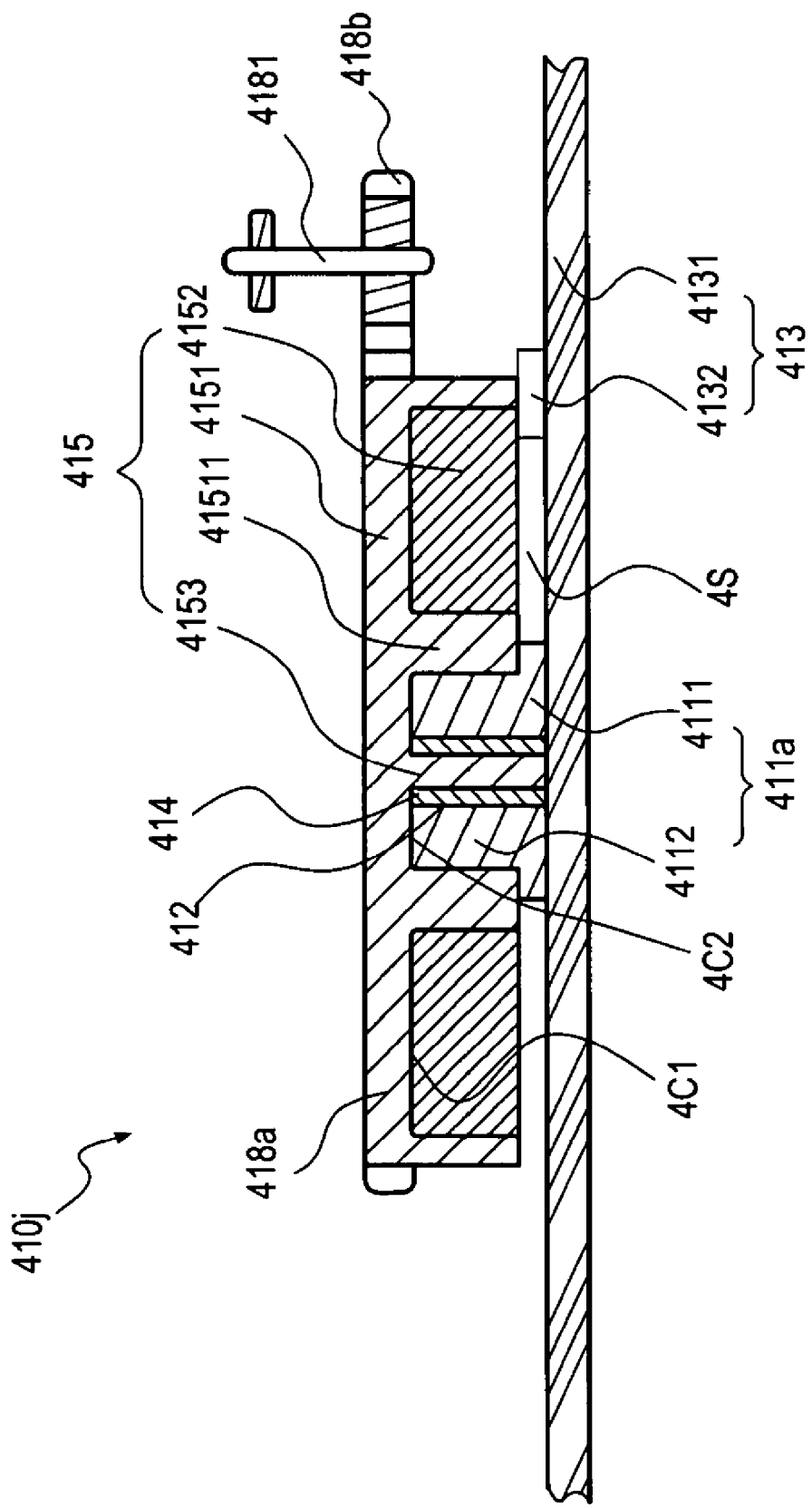
FIG. 18A is a sectional view of the motor module of a twentieth embodiment in the present invention.
Figure 18B:
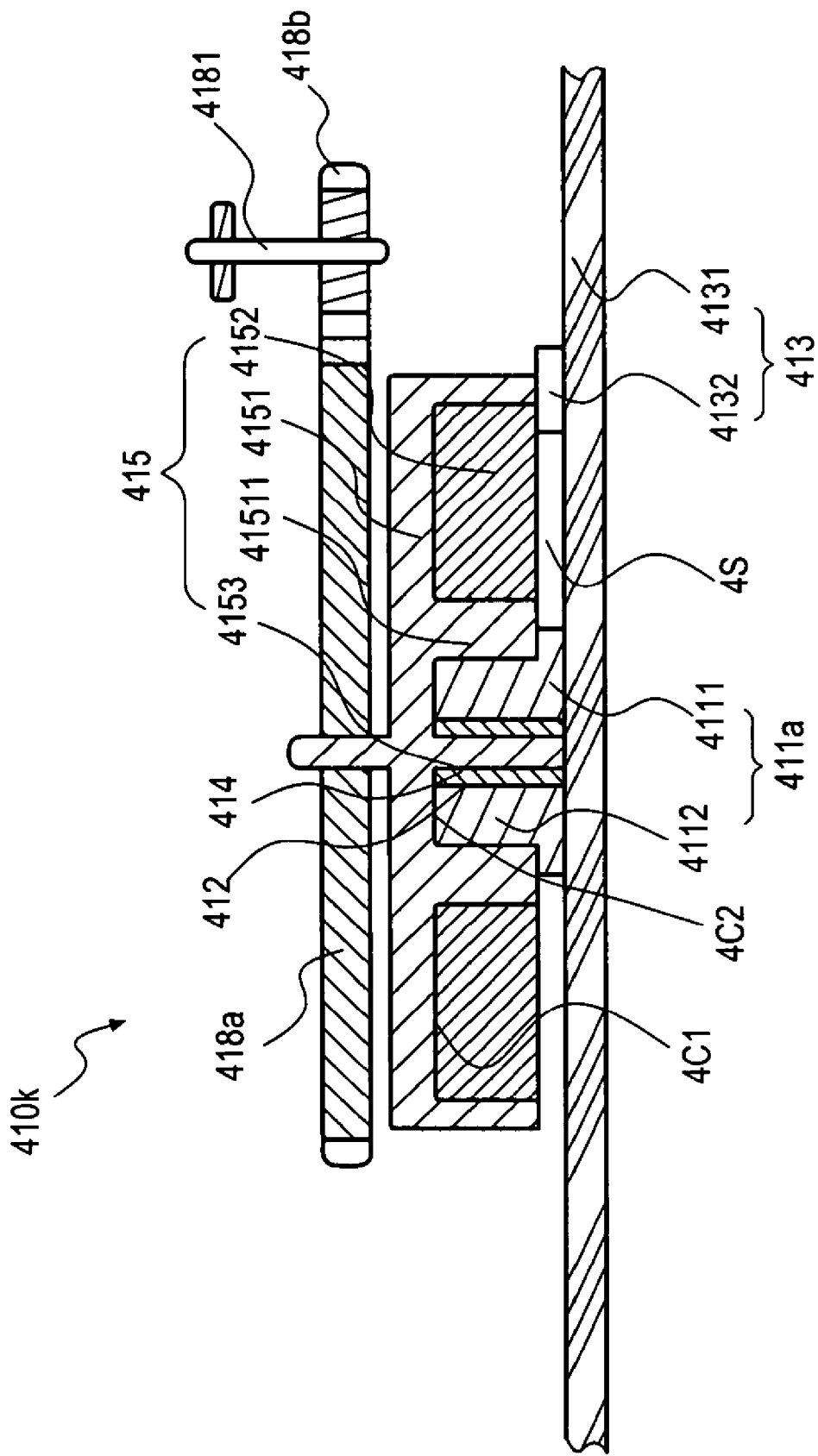
FIG. 18B is a sectional view of the motor module of a twenty-first embodiment in the present invention.

Referring to FIG. 18, the magnetic rotor unit 415 of the motor module 410a of the eleventh embodiment can be disposed with a gear 418a, and the gear 418a can cooperate with another gear 418b to constitute a motor module 410j with gear set of a twentieth embodiment of the present invention, wherein the gear 418b further has a spindle 4181 for outputting power. Or, referring to FIG. 18B, a gear 418a is disposed on the core axis 4153, and cooperated with another gear 418b, so as to constitute a motor module 410k with gear set of a twenty-first embodiment of the present invention, wherein the gear 418b further has a spindle 4181 for outputting power.

Figure 19A:
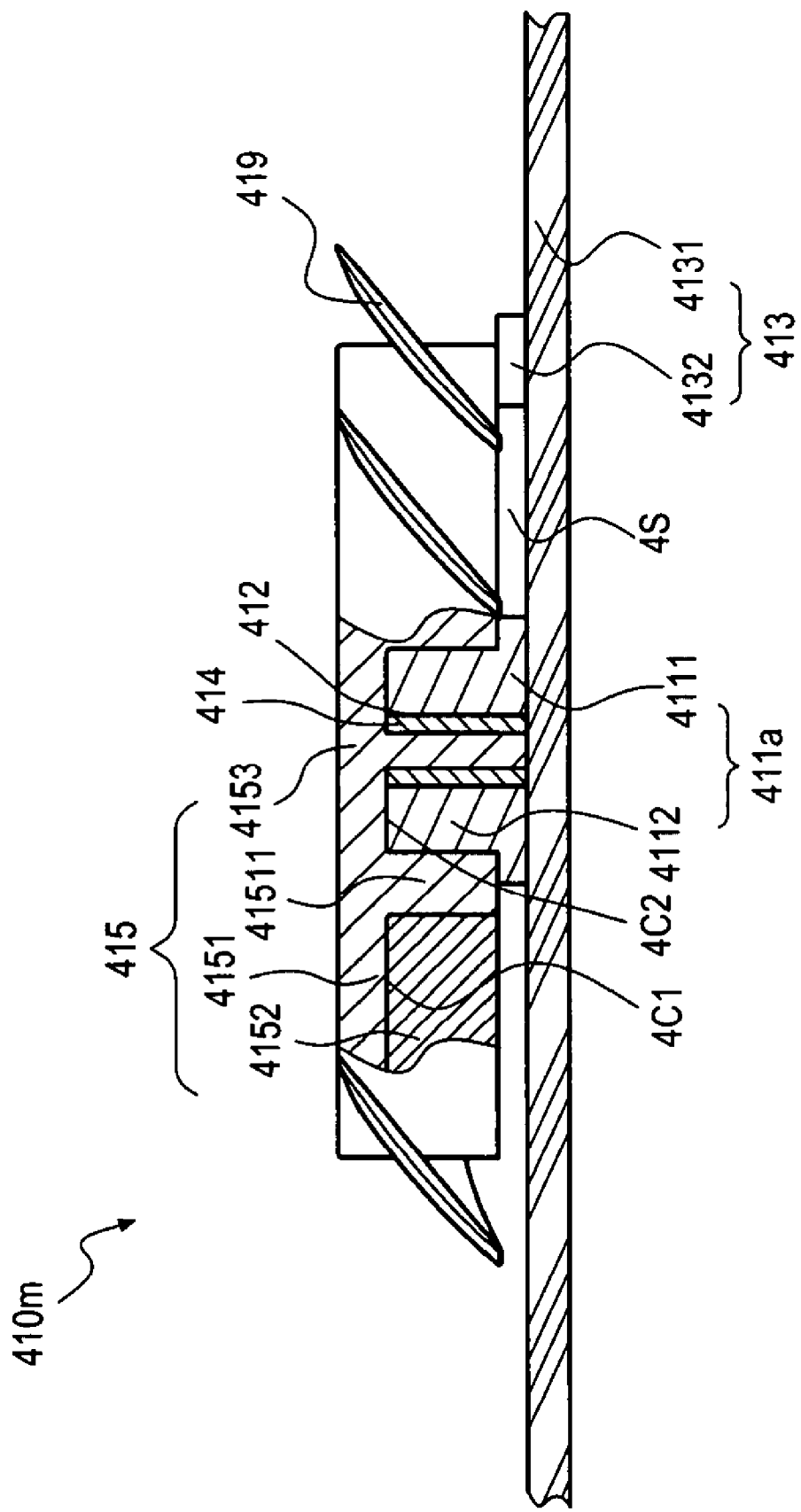
FIG. 19A is a partial sectional view of the motor module of a twenty-second embodiment in the present invention.
Figure 19B:
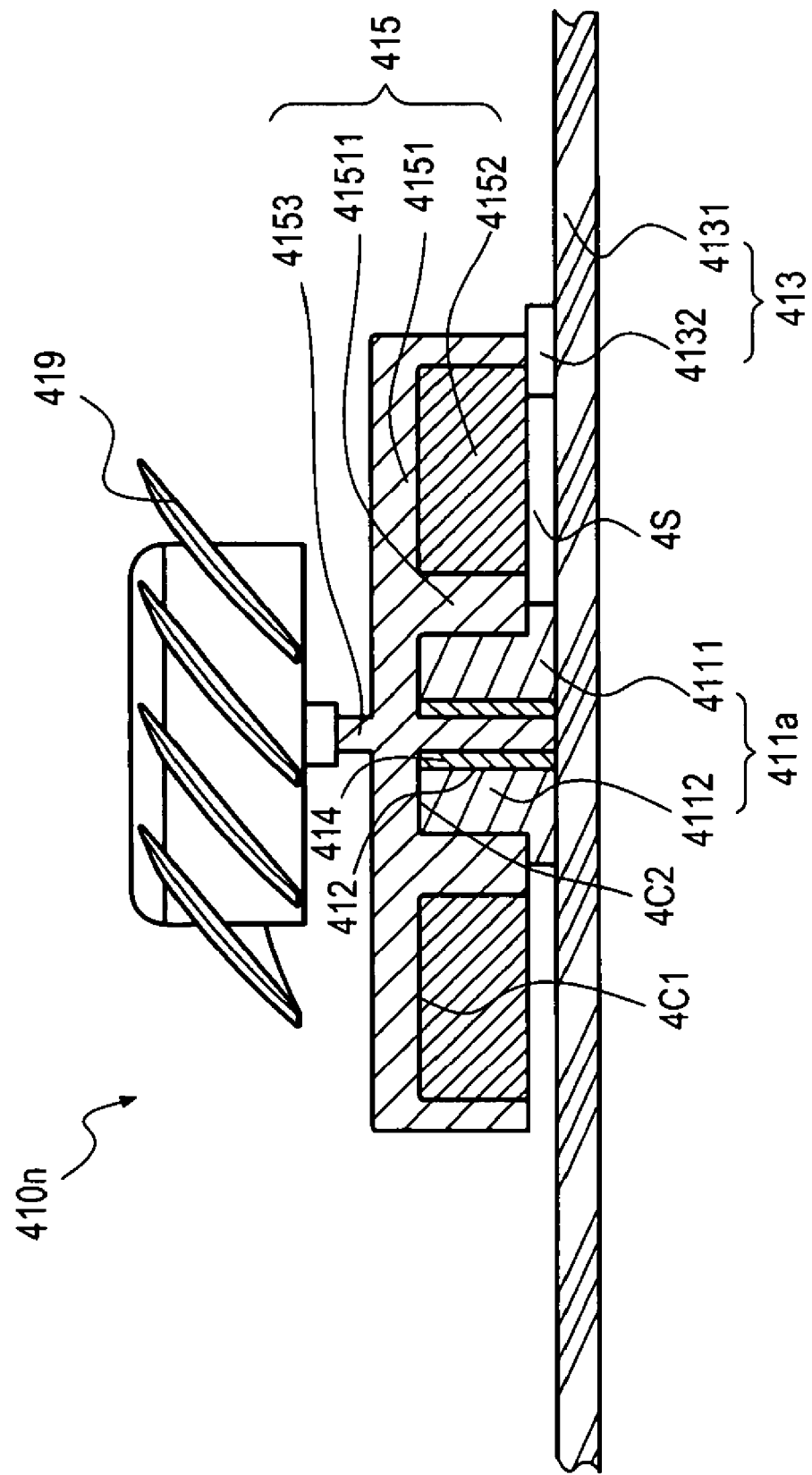
FIG. 19B is a sectional view of the motor module of a twenty-third embodiment in the present invention.

Referring to FIG. 19A, the magnetic rotor unit 415 of the motor module 410a of the eleventh embodiment can be disposed with a plurality of pump vanes 419, so as to constitute a motor module 410m with flow distribution function of a twenty-second embodiment of the present invention. Or, referring to FIG. 19B, a plurality of pump vanes 419 is disposed on the core axis 4153, so as to constitute a motor module 410n with flow distribution function of a twenty-third embodiment of the present invention.

Figure 20A:
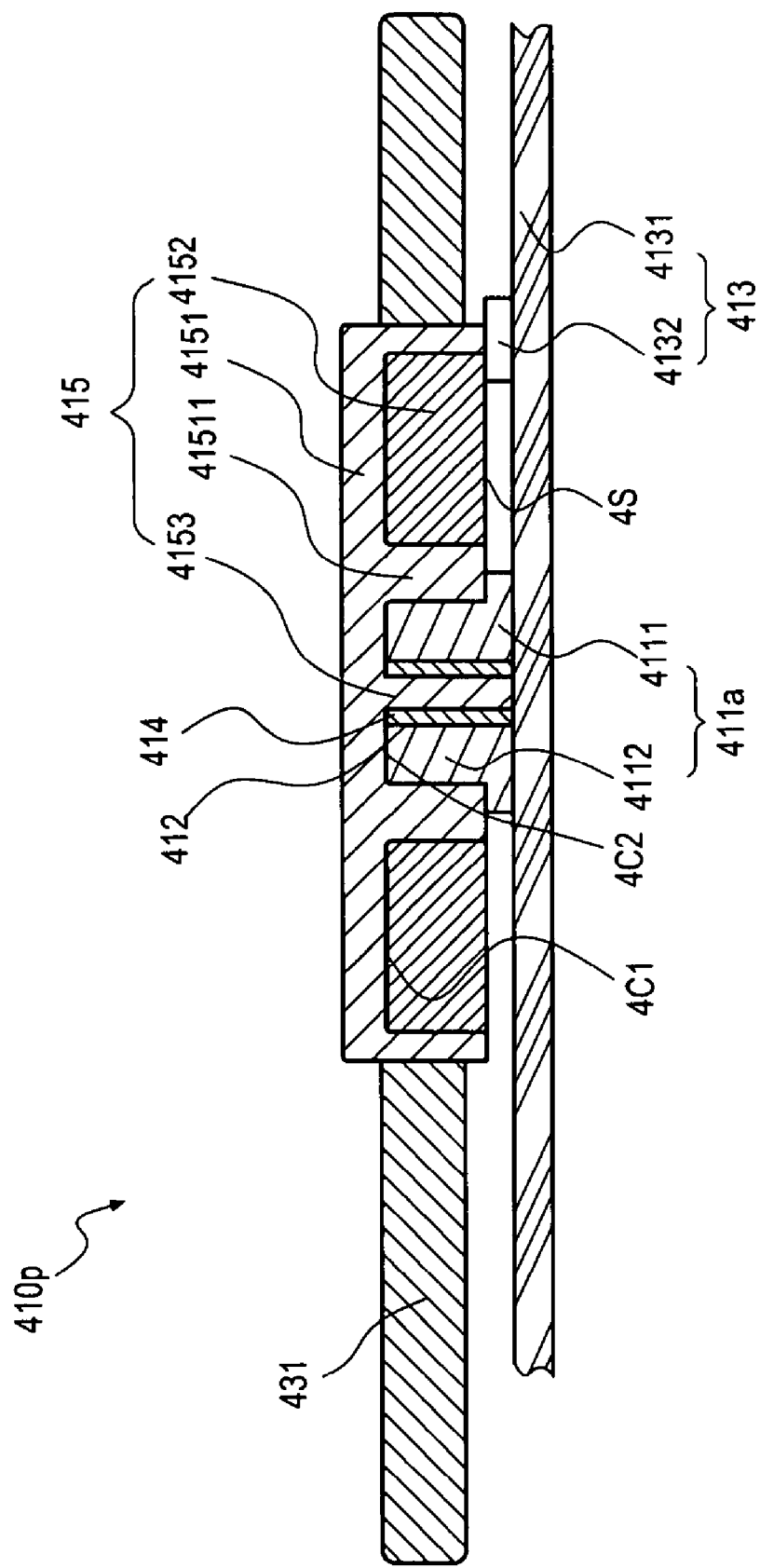
FIG. 20A is a sectional view of the motor module of a twenty-fourth embodiment in the present invention.
Figure 20B:
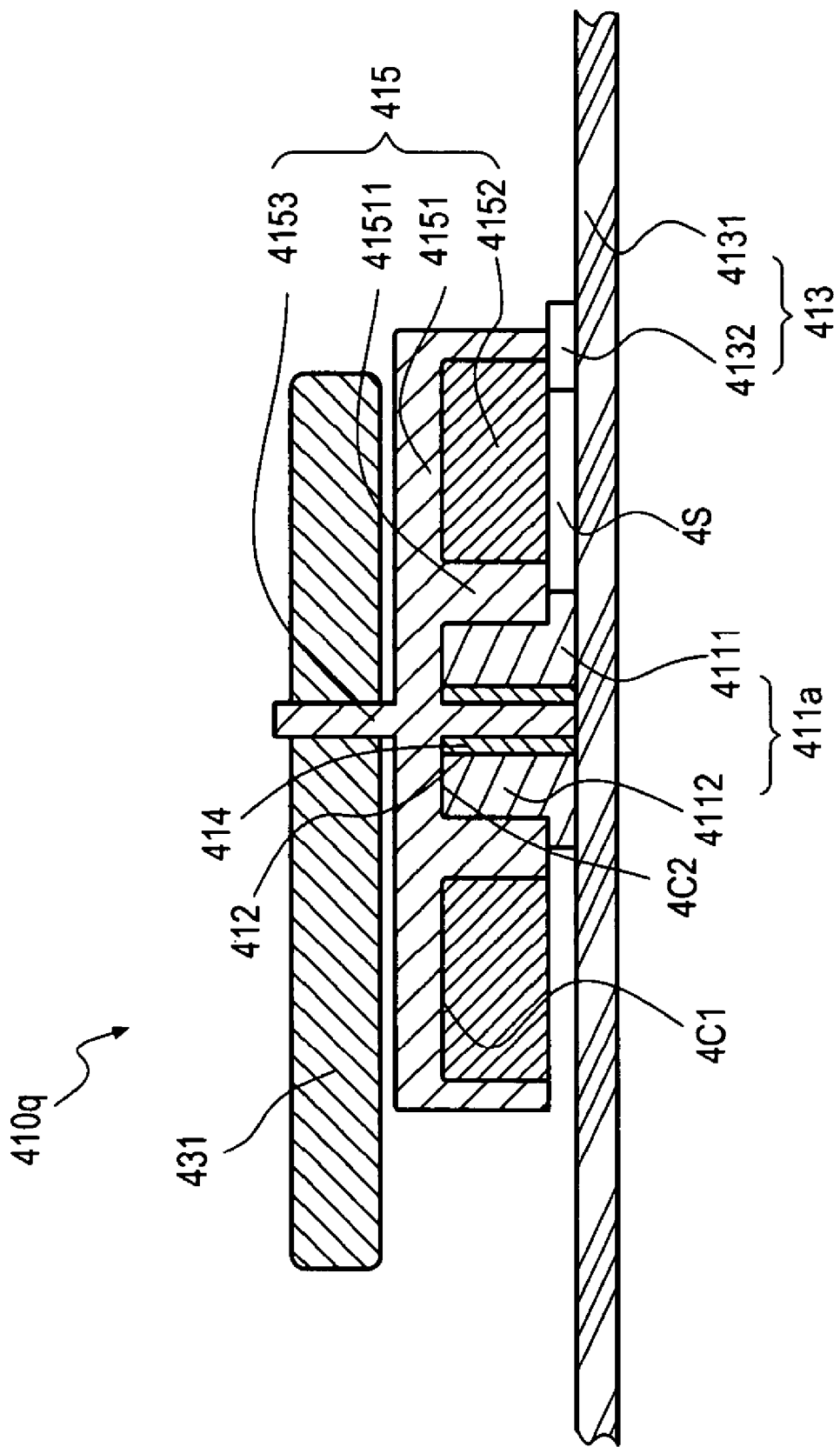
FIG. 20B is a sectional view of the motor module of a twenty-fifth embodiment in the present invention.

Referring to FIG. 20A, the magnetic rotor unit 415 of the motor module 410a of the eleventh embodiment can be disposed with an eccentric wheel 431. And because the magnetic rotor unit 415 drives the eccentric wheel 431 to rotate, they can constitute a motor module 410p with vibration function of a twenty-fourth embodiment of the present invention. Or, referring to FIG. 20B, an eccentric wheel 431 is disposed on the core axis 4153, so as to constitute a motor module 410q with flow distribution function of a twenty-fifth embodiment of the present invention.

Figure 21A:
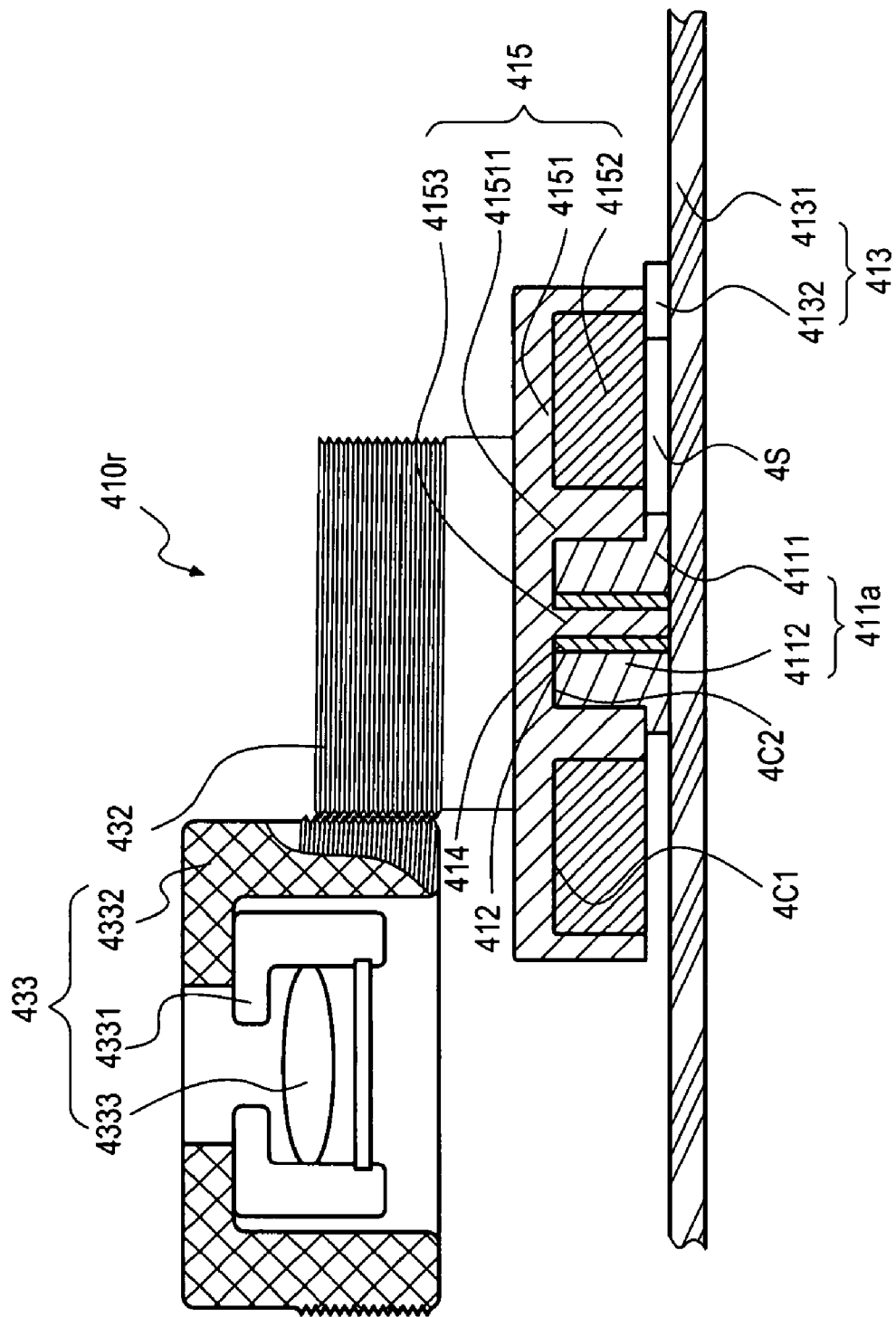
FIG. 21A is a sectional view of the motor module of a twenty-sixth embodiment in the present invention.
Figure 21B:
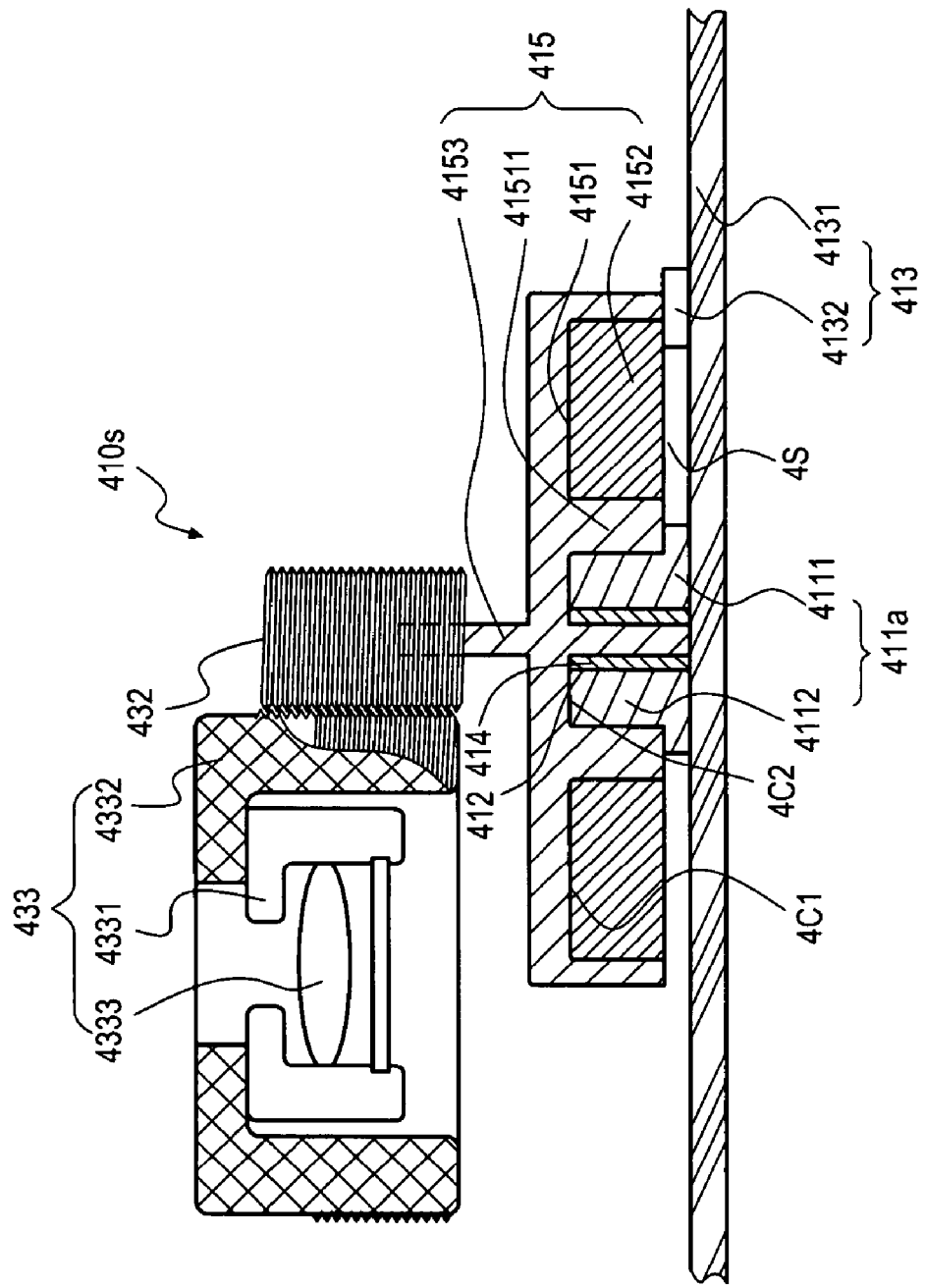
FIG. 21B is a sectional view of the motor module of a twenty-seventh embodiment in the present invention.

Referring to FIG. 21A, the magnetic rotor unit 415 of the motor module 410a of the eleventh embodiment can be disposed with a driving device 432, and the driving device 432 can assembly with an auto focus module 433. The driving device 432 can be driven by connecting with the magnetic rotor unit 415, and the driving method can be achieved by means of thread groove, gear structure, or cam structure, so that the auto focus module 433 can expand and contract. That is, the auto focus module 433 comprising a lens barrel 4331, an actuator 4332, and a lens 4333 can be driven to expand and contract to achieve focus. Therefore, a motor module 410r with auto focus function of a twenty-sixth embodiment can be constituted by the magnetic rotor unit 415 driving the drive device 432 to control the auto focus module 433. Or, referring to FIG. 21B, a driving device 432 is disposed on the core axis 4153, so as to constitute a motor module 410s with auto focus function of a twenty-seventh embodiment Except the motor module 410a of the eleventh embodiment can be taken as varied application examples, the motor modules of the twelfth embodiment to the fifteenth embodiment can also be configured in the same way as that of the eleventh embodiment in practice.

Figure 22:
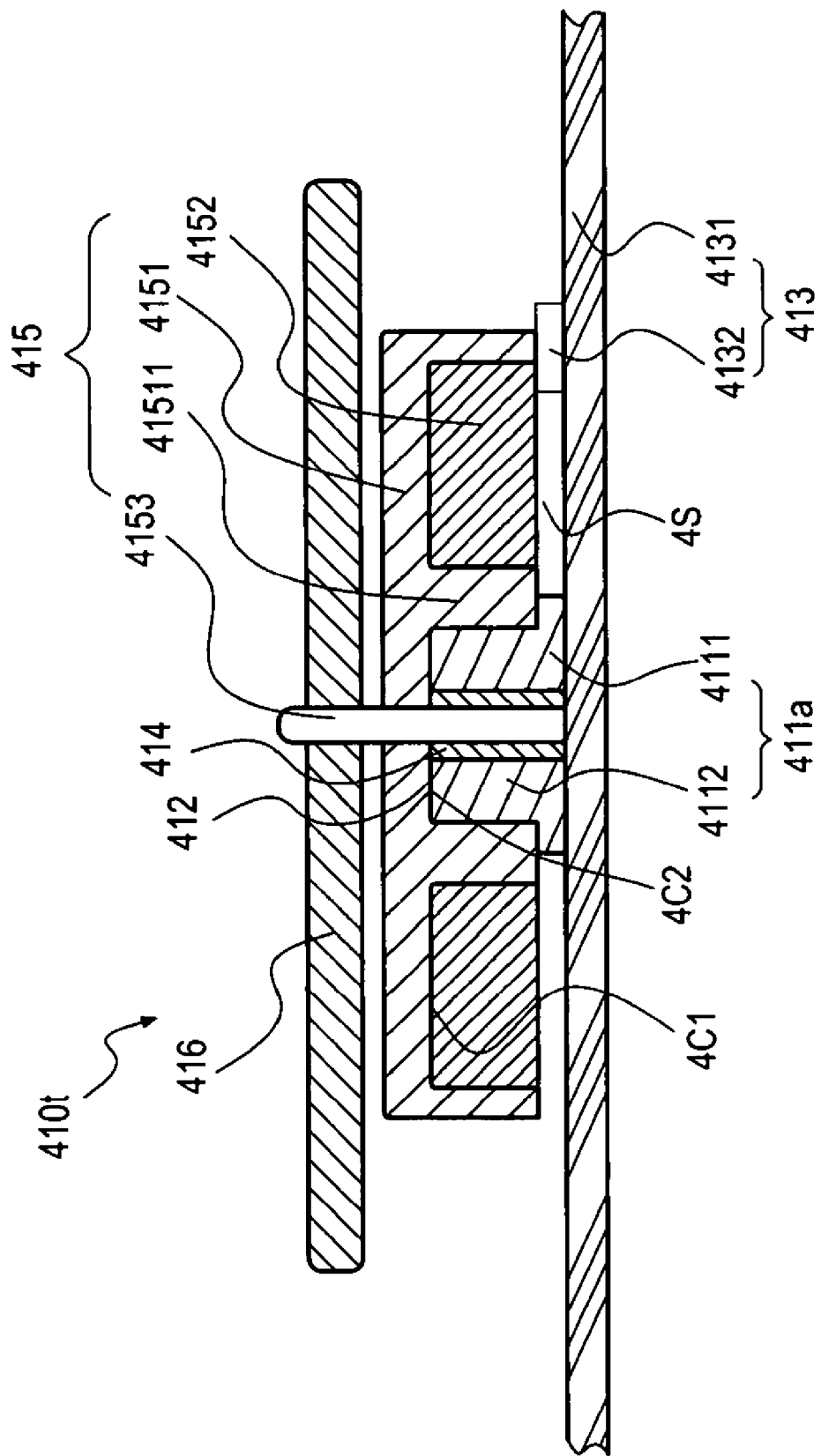
FIG. 22 is a sectional view of the motor module of a twenty-eighth embodiment in the present invention.

In addition, referring to FIG. 22, in this embodiment, the core axis 4153 further can be a detachable core axis, and a carrier 416 is also disposed on the core axis 4153. Therefore, the motor module 410t of a twenty-eighth embodiment can be used to carry an optical disk and is similar to that in the seventeenth embodiment. Of cause, the core axis 4153 in rests of the embodiments can also be a detachable core axis.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motor module, comprising:
a bearing housing, having a loading base and a protruding portion being extending from one end of the loading base;
an electric unit, having a printed circuit board (PCB) and a plurality of sensing elements, the loading base being disposed on the PCB, and by means of wirings, signal circuits and motor windings being formed on the PCB, where being around the disposed loading base, and the sensing elements being disposed around the motor windings of the PCB;
a bearing, being disposed at the protruding portion; and
a magnetic rotor unit, being disposed not only on the bearing but also on the motor windings, keeping a gap with the PCB, when electric current passing the motor windings of the electric unit, the motor windings and the magnetic rotor unit generating a flux linkage induction, so as to drive the magnetic rotor unit to rotate relative to the PCB.

2. The motor module as claimed in claim 1, wherein the magnetic rotor unit comprises an upper lid and a permanent magnetic ring, the permanent magnetic ring being disposed in the upper lid, and the upper lid being stackedly disposed on the bearing, making the permanent magnetic ring keep a gap relative to the motor windings, when electric current passing the motor windings of the electric unit, the motor windings and the permanent magnetic ring generating a flux linkage induction, so as to drive the magnetic rotor unit to rotate.

3. The motor module as claimed in claim 1, wherein the bearing is sleeved into outer surface of the protruding portion.

4. The motor module as claimed in claim 3, wherein the upper lid has a ring wall, the upper lid being partitioned by the ring wall into a first covering area and a second covering area, the permanent magnetic ring being disposed in the first covering area, and the second covering area covering on the bearing.

5. The motor module as claimed in claim 4, wherein the upper lid has an opening relative to top of the protruding portion of the bearing housing.

6. The motor module as claimed in claim 1, wherein the plurality of sensing elements of the electric unit is a Hall element, the Hall elements being used to form an electric angle of 120° between phases, disposed around the motor windings for sensing rotating of the magnetic rotor unit, so as switch power-on-state of the motor windings.

7. The motor module as claimed in claim 1, wherein the wiring means is selected from a group comprising a screen printing method, a photolithography method, a ink-jet printing method, an imprinting printing, an electro forming method, or any method combination thereof, to form the motor windings having multiple layers of wires.

8. The motor module as claimed in claim 1, wherein the bearing is a ball bearing, a hydrodynamic bearing, or a sleeve bearing.

9. The motor module as claimed in claim 1, wherein the PCB has a through hole for disposing the loading base therein, so that the loading base can be combined to the PCB.

10. The motor module as claimed in claim 1, wherein the motor module further includes a bottom plate for carrying the PCB.

11. The motor module as claimed in claim 9, wherein the PCB is disposed on a bottom plate.

12. The motor module as claimed in claim 10, wherein the bottom plate has a punch hole, a through hole corresponding the punch hole is disposed on the PCB, and a mounting portion is extending from one end of the loading base, the through hole being used for disposing the loading base therein, so that the loading base being combined to the PCB, the mounting portion being inserted into the punch hole, so that the loading base being disposed on the bottom plate.

13. The motor module as claimed in claim 1, wherein the magnetic rotor unit is disposed with a carrier.

14. The motor module as claimed in claim 2, wherein the upper lid is disposed with a carrier.

15. The motor module as claimed in claim 1, wherein the magnetic rotor unit is disposed with a group of blades.

16. The motor module as claimed in claim 2, wherein the upper lid is disposed with a group of blades.

17. The motor module as claimed in claim 1, wherein the magnetic rotor unit is disposed with a gear.

18. The motor module as claimed in claim 2, wherein the upper lid is disposed with a gear.

19. The motor module as claimed in claim 1, wherein the magnetic rotor unit is disposed with a plurality of pump vanes.

20. The motor module as claimed in claim 2, wherein the upper lid is disposed with a plurality of pump vanes.

21. The motor module as claimed in claim 1, wherein the magnetic rotor unit is disposed with an eccentric wheel.

22. The motor module as claimed in claim 2, wherein the upper lid is disposed with an eccentric wheel.

23. The motor module as claimed in claim 1, wherein the magnetic rotor unit is disposed with a driving device.

24. The motor module as claimed in claim 2, wherein the upper lid is disposed with a driving device.

25. The motor module as claimed in claim 1, wherein the protruding portion is disposed with a hole for disposing the bearing therein.

26. The motor module as claimed in claim 25, wherein the magnetic rotor unit comprises an upper lid and a permanent magnetic ring, the permanent magnetic ring being disposed in the upper lid and the upper lid having a core axis, the core axis being disposed in the bearing, making the permanent magnetic ring keep a gap relative to the motor windings, when electric current passing the motor windings of the electric unit, the motor windings and the permanent magnetic ring generating a flux linkage induction, so as to drive the magnetic rotor unit to rotate.

27. The motor module as claimed in claim 26, wherein the upper lid has a ring wall, the upper lid being partitioned by the ring wall into a third covering area and a fourth covering area, the permanent magnetic ring being disposed in the third covering area, and the fourth covering area covering on the protruding portion of the bearing housing.

28. The motor module as claimed in claim 26, wherein the core axis is disposed with a carrier.

29. The motor module as claimed in claim 26, wherein the core axis is disposed with a group of blades.

30. The motor module as claimed in claim 26, wherein the core axis is disposed with a gear.

31. The motor module as claimed in claim 26, wherein the core axis is disposed with a plurality of pump vanes.

32. The motor module as claimed in claim 26, wherein the core axis is disposed with an eccentric wheel.

33. The motor module as claimed in claim 26, wherein the core axis is disposed with a driving device.

34. The motor module as claimed in claim 25, wherein the protruding portion has a hole for disposing the bearing therein.

* * * * *